(12) United States Patent
Alferov

(10) Patent No.: US 12,079,200 B2
(45) Date of Patent: Sep. 3, 2024

(54) METHOD AND SYSTEM FOR AUDIT AND PAYMENT CLEARING OF ELECTRONIC TRADING SYSTEMS USING BLOCKCHAIN DATABASE

(71) Applicant: Fiducia DLT LTD, London (GB)

(72) Inventor: Igor Alferov, Moscow (RU)

(73) Assignee: Fiducia DLT LTD, London (GB)

( * ) Notice: Subject to any disclaimer, the term of this patent is extended or adjusted under 35 U.S.C. 154(b) by 391 days.

(21) Appl. No.: 16/797,891

(22) Filed: Feb. 21, 2020

(65) Prior Publication Data
US 2020/0272619 A1 Aug. 27, 2020

Related U.S. Application Data

(60) Provisional application No. 62/808,780, filed on Feb. 21, 2019.

(51) Int. Cl.
| | |
|---|---|
| *G06Q 20/40* | (2012.01) |
| *G06F 16/23* | (2019.01) |
| *G06F 16/27* | (2019.01) |
| *G06Q 30/0242* | (2023.01) |
| *G06Q 40/04* | (2012.01) |
| *G06Q 50/26* | (2012.01) |

(Continued)

(52) U.S. Cl.
CPC .......... *G06F 16/2379* (2019.01); *G06F 16/27* (2019.01); *G06Q 30/0246* (2013.01); *G06Q 40/04* (2013.01); *G06Q 50/265* (2013.01); *H04L 9/0637* (2013.01); *H04L 9/0643* (2013.01); *G06Q 2220/10* (2013.01); *H04L 9/50* (2022.05)

(58) Field of Classification Search
CPC ... H04L 2209/38; H04L 9/0643; G06Q 10/10; G06Q 2220/00; G06F 21/602
See application file for complete search history.

(56) References Cited

U.S. PATENT DOCUMENTS 10,104,077 B1 * 10/2018 Irwan ...................... G06F 21/45
10,757,103 B2 * 8/2020 Irwan .................. H04W 12/086
(Continued)

OTHER PUBLICATIONS

Croman, Kyle et al. "On Scaling Decentralized Blockchains (A Position Paper)", 20 pgs. (Jan. 1, 2016).
(Continued)

*Primary Examiner* — Steven S Kim
*Assistant Examiner* — Sima Asgari
(74) *Attorney, Agent, or Firm* — LOZA & LOZA, LLP

(57) ABSTRACT

Methods and systems for authentication, immutability and trusted timestamping of large audit event logs reported by electronic platforms are disclosed. In an embodiment, a method involves: audit log events aggregation into time-frame aligned data blocks, reporting of data block hashes into blockchain database for authentication, immutability and trusted timestamping. An aspect of the method involves achieving authentication, immutability and trusted time-stamping guarantees for audit log events with low computational and networking overhead due to utilization of blockchain database consensus protocol only for batched event data blocks rather than for separate events. Multiple events during specific period of time are grouped into separate data block and cryptographic hash of the whole block is reported to blockchain database to ensure its authentication, immutability and trusted timestamping.

6 Claims, 24 Drawing Sheets

Figure 1:
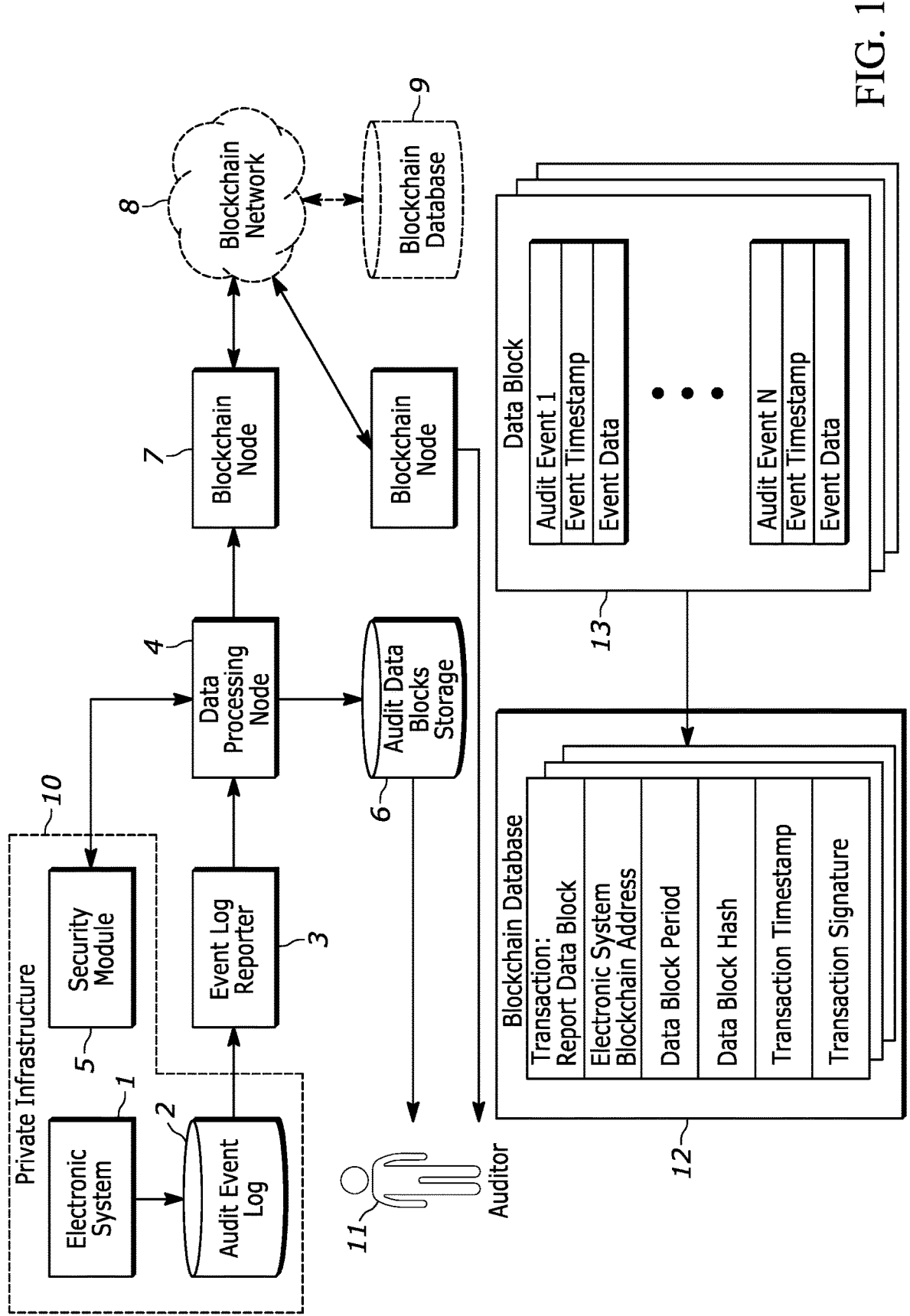

(51) Int. Cl.
*H04L 9/06* (2006.01)
*H04L 9/00* (2022.01)

(56) References Cited

U.S. PATENT DOCUMENTS

| | | | | |
|---|---|---|---|---|
| 2002/0138762 | A1* | 9/2002 | Horne | H04L 63/1425 |
| | | | | 707/999.2 |
| 2005/0228881 | A1* | 10/2005 | Reasor | H04N 21/43615 |
| | | | | 709/224 |
| 2008/0034415 | A1* | 2/2008 | Chacko | G06F 21/6218 |
| | | | | 726/14 |
| 2012/0179646 | A1* | 7/2012 | Hinton | G06F 16/25 |
| | | | | 707/607 |
| 2014/0283144 | A1* | 9/2014 | Gettings | G08B 23/00 |
| | | | | 726/30 |
| 2016/0217532 | A1 | 7/2016 | Slavin | |
| 2017/0228822 | A1 | 8/2017 | Creighton, IV et al. | |
| 2018/0053161 | A1 | 2/2018 | Bordash et al. | |
| 2018/0063238 | A1 | 3/2018 | Zhang | |
| 2018/0285433 | A1* | 10/2018 | Pavon | G06F 16/258 |
| 2018/0322040 | A1* | 11/2018 | Nikoloudakis | G06F 3/0652 |
| 2019/0245856 | A1* | 8/2019 | Irwan | H04L 9/0643 |
| 2019/0266146 | A1* | 8/2019 | Rose | G06F 16/215 |
| 2020/0126321 | A1* | 4/2020 | Swearingen | G06Q 30/0281 |
| 2020/0127811 | A1* | 4/2020 | Sridhar | G06F 21/6254 |
| 2020/0183913 | A1* | 6/2020 | Murphy | G06F 16/9024 |
| 2020/0186501 | A1* | 6/2020 | Neystadt | H04L 67/10 |

OTHER PUBLICATIONS

Ismail, Anji et al. "(VAD) The Verified Ad Protocol", 64 pgs. (Apr. 11, 2018).
Brave Software "Basic Attention Token (BAT)", Blockchain Based Digital Advertising, 37 pages (Mar. 13, 2018).

* cited by examiner

METHOD AND SYSTEM FOR AUDIT AND PAYMENT CLEARING OF ELECTRONIC TRADING SYSTEMS USING BLOCKCHAIN DATABASE

FIELD OF THE INVENTION

Embodiments of the subject matter described herein relate generally to blockchain and distributed computer system application for enforcement of data security guarantees, which include availability, authenticity, immutability, confidentiality, trusted timestamping and non-repudiation, for data exchange within computer based electronic trading systems, including programmatic advertising systems and financial exchanges.

BACKGROUND

Most notable electronic trading systems include programmatic advertising platforms, where ads are bought using real-time bidding protocol, and financial exchanges, where algorithmic trading programs are making trade deals. Major problems of such systems are: 1) entities which control the platform can collude, manipulate trade data and violate protocol rules to increase their own profits (for example, artificially increasing advertising auction price reported to the customer, or shuffling transaction sequences and timing in matching module of financial exchange preferring some client deals over others); 2) on site audit/certification of platforms have high cost and do not guarantee absence of manipulations, as attacks may be done between audits with cleanup of any trace logs, which might expose them; 3) it is very hard to collect intelligence/forensics and enforce penalties for bad actors; 4) payment clearing takes a lot of time and consumes a lot of resources, as in many cases data has to be processed manually for reconciliation and discrepancies management between different platforms.

It creates poor economy, where improper behavior of trading systems suppliers is financially motivated, while good actors cannot prove themselves and hence are financially penalized. Absence of regulators and enforcement mechanisms in programmatic advertising industry led to very inefficient supply chain, where intermediary platform costs for ad buyer (advertiser) and ad seller (web site, mobile app) are usually above 60% of overall budget.

Briefly, a blockchain is a distributed database of records, essentially it is an online ledger of transactions which is executed and shared among participants of a blockchain network. Each transaction is verified by a consensus of the network participants which allows for a failure proof validation system prior to the data being entered, and further no corruption of the entered data can happen because the transaction information can never be erased and not easily modified. Currently, bitcoin, the digital currency is an accepted decentralized digital currency which relies on blockchain technology and the use of consensus validation when transactions of bitcoins are entered onto an online ledger.

BRIEF DESCIPTION OF THE DRAWINGS

FIG. 1. Block diagram of a system, where a method for authentication, immutability and trusted timestamping for large audit event logs of electronic systems may be practiced, and data layout scheme for blockchain database and audit data storage.

Figure 2:
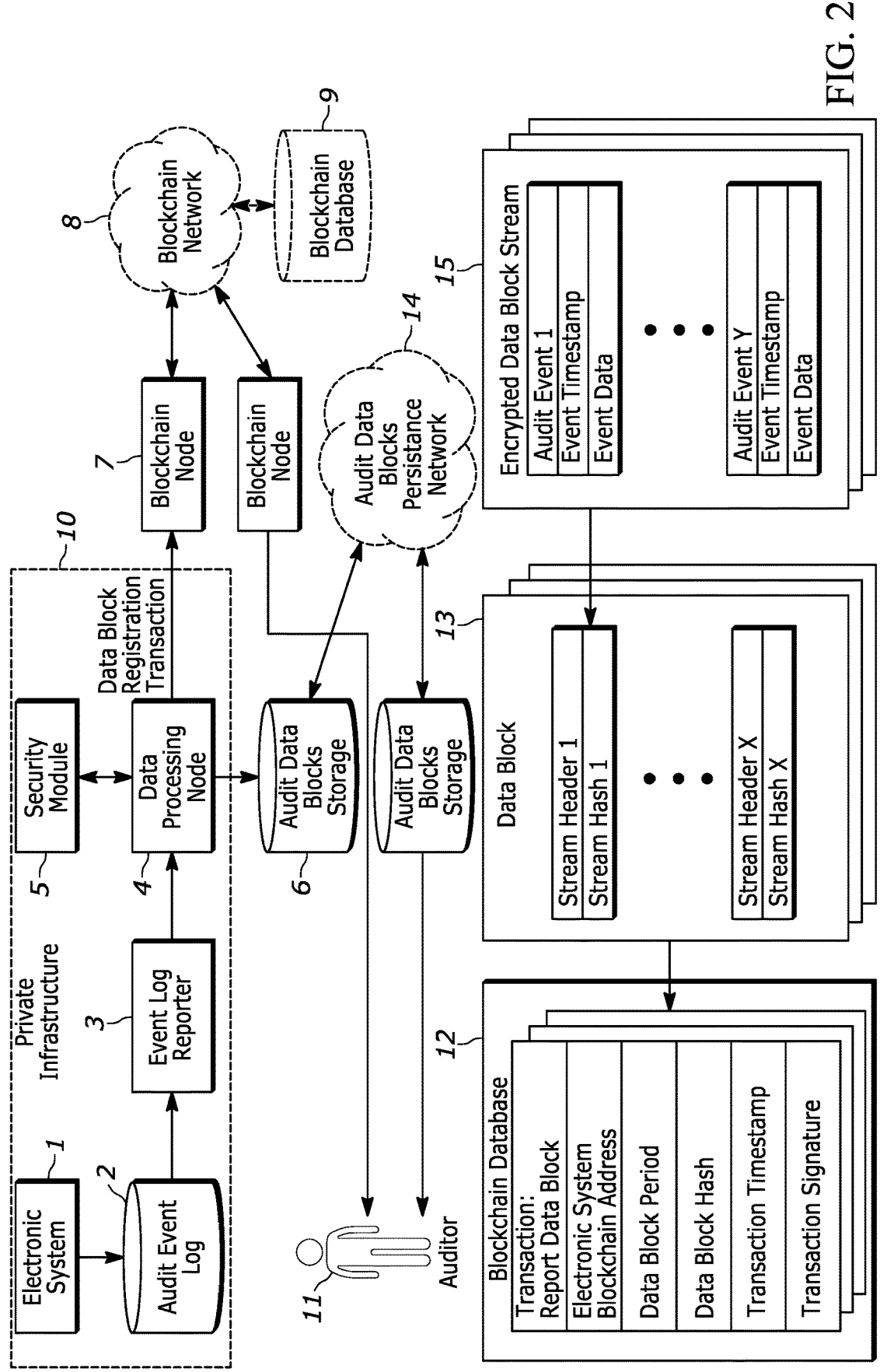

FIG. 2. Block diagram of a system, where a method for authentication, immutability, trusted timestamping, availability and permissioned read access for large audit event logs of electronic systems may be practiced, and data layout scheme for blockchain database and audit data storage.

Figure 3A:
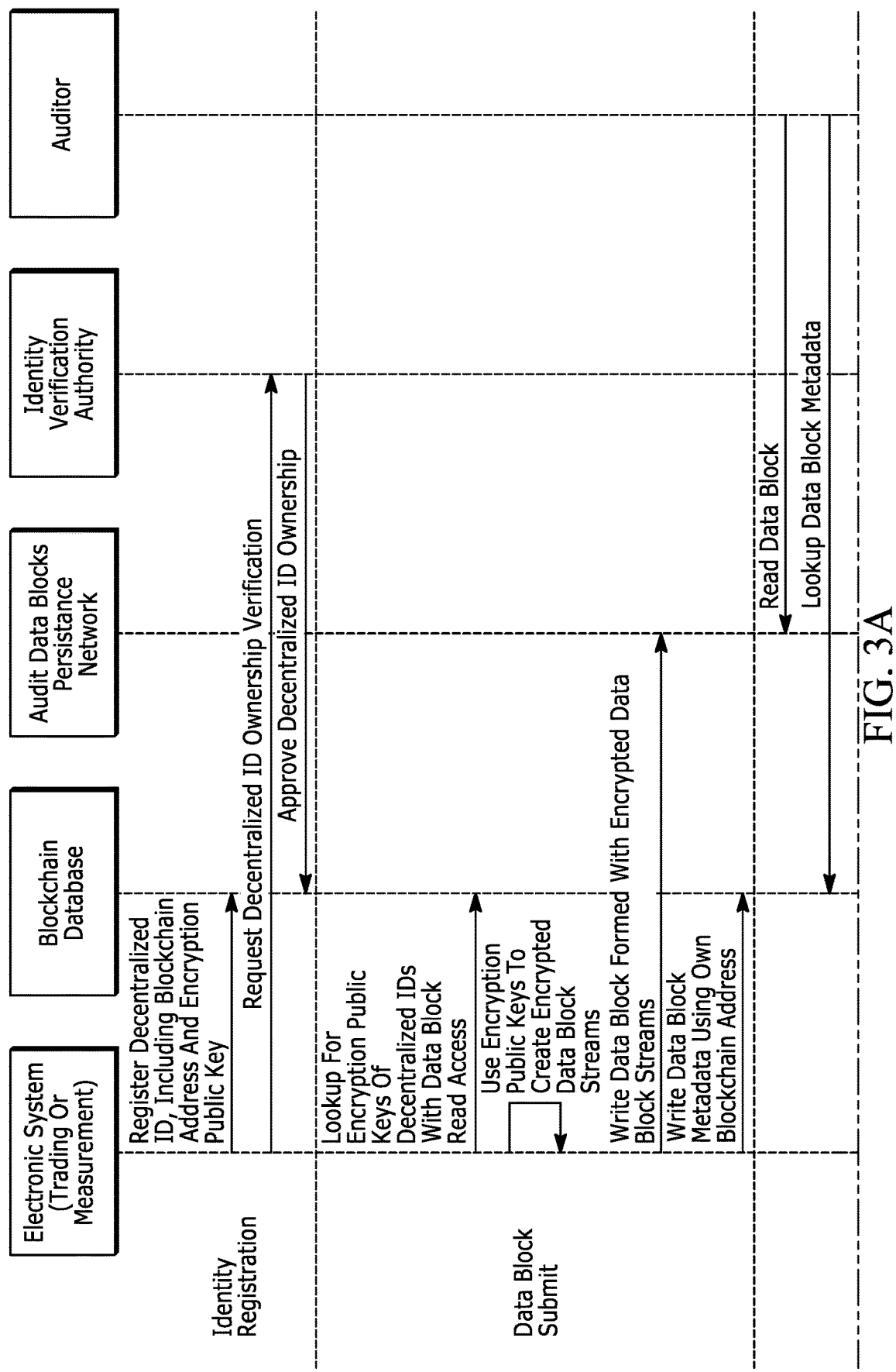
Figure 3B:
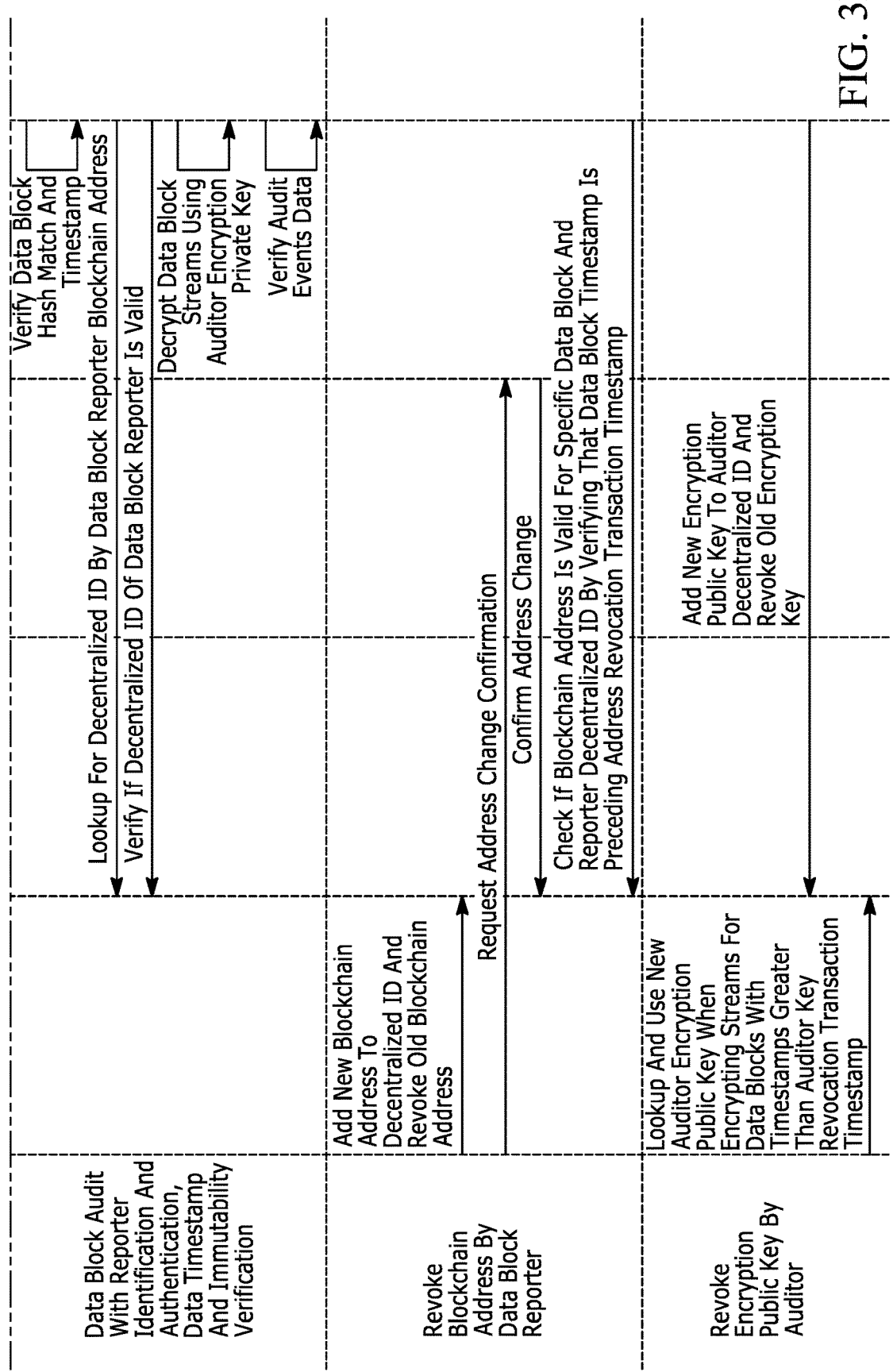
Figure 4A:
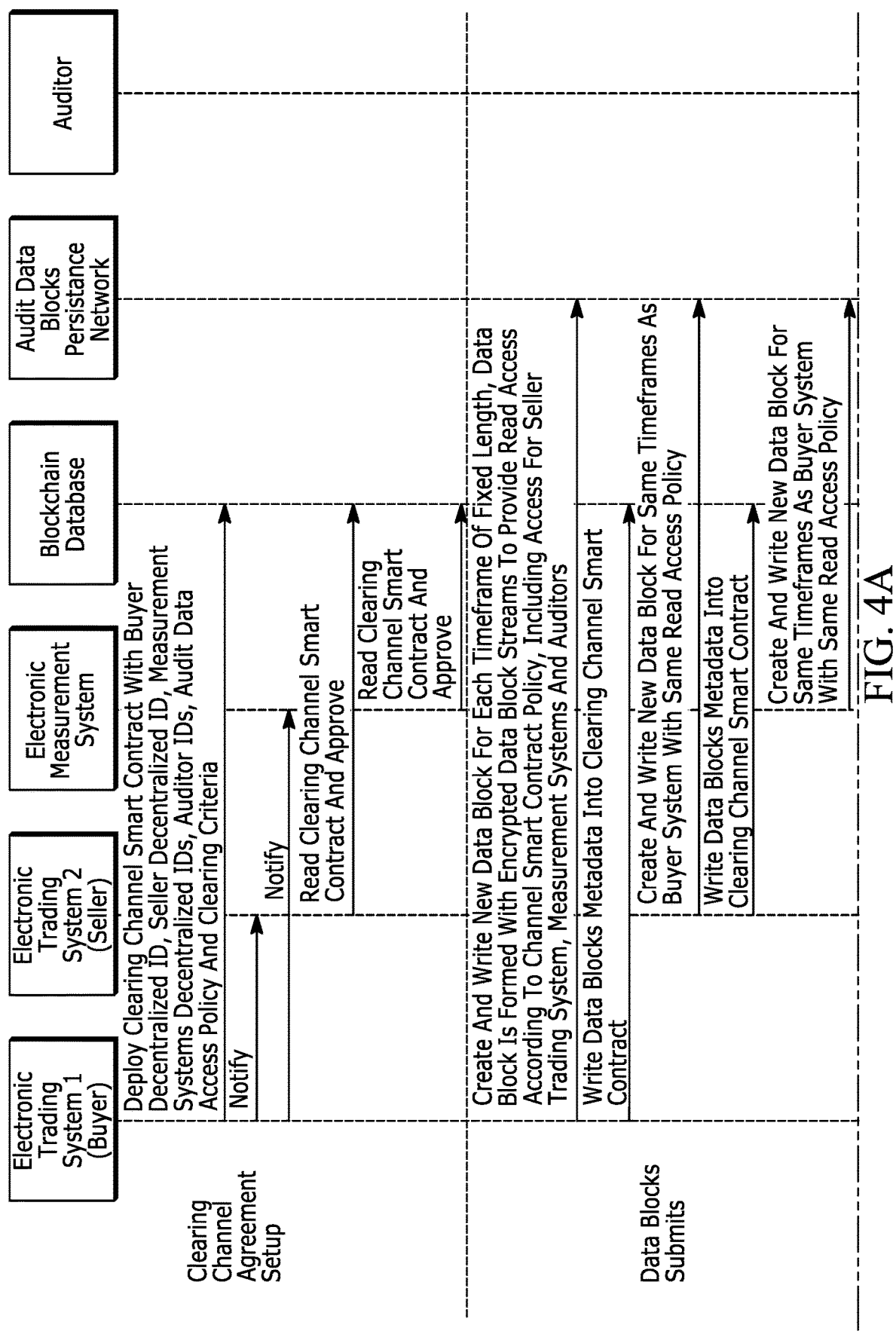
Figure 4B:
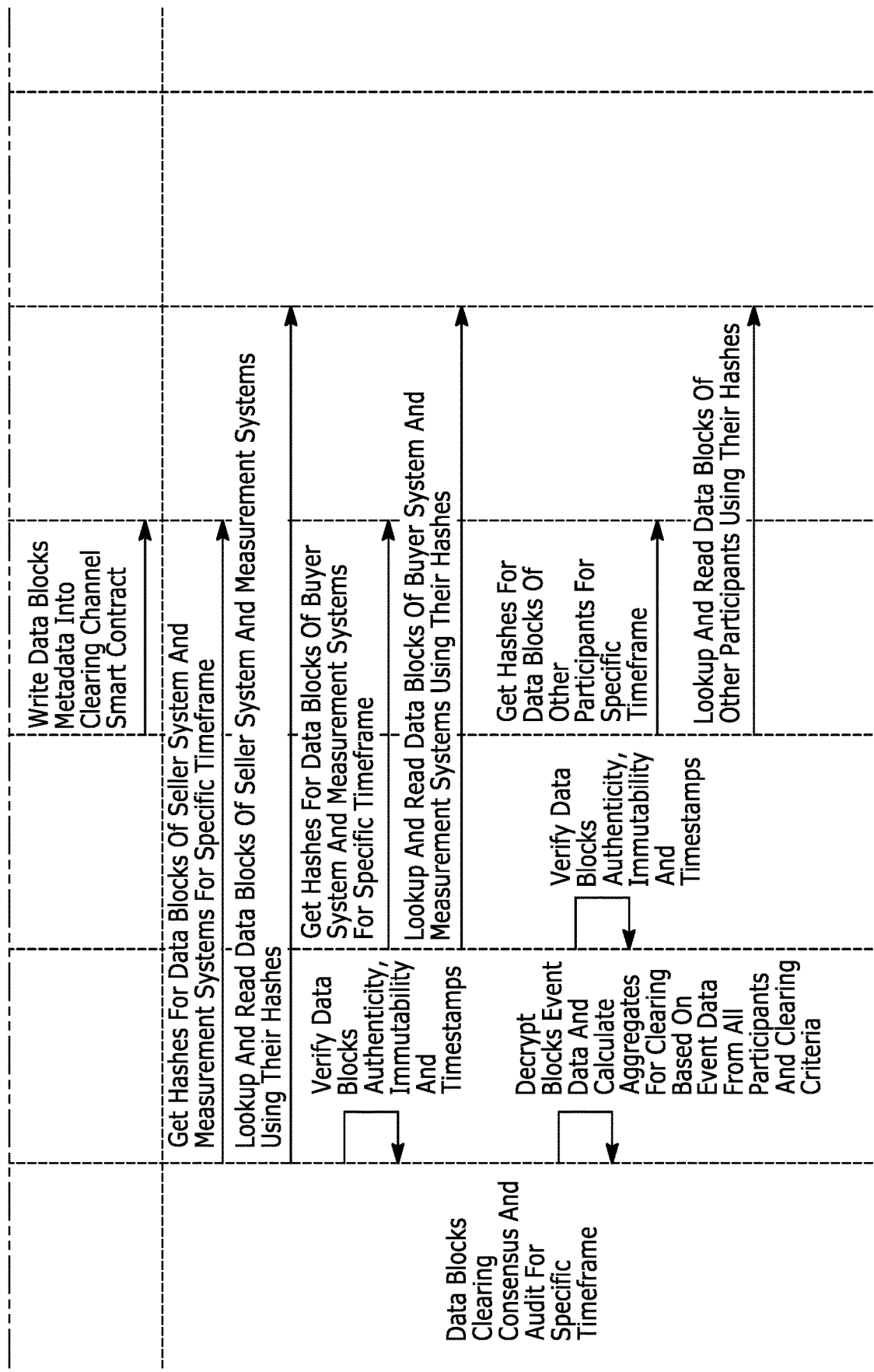
Figure 4C:
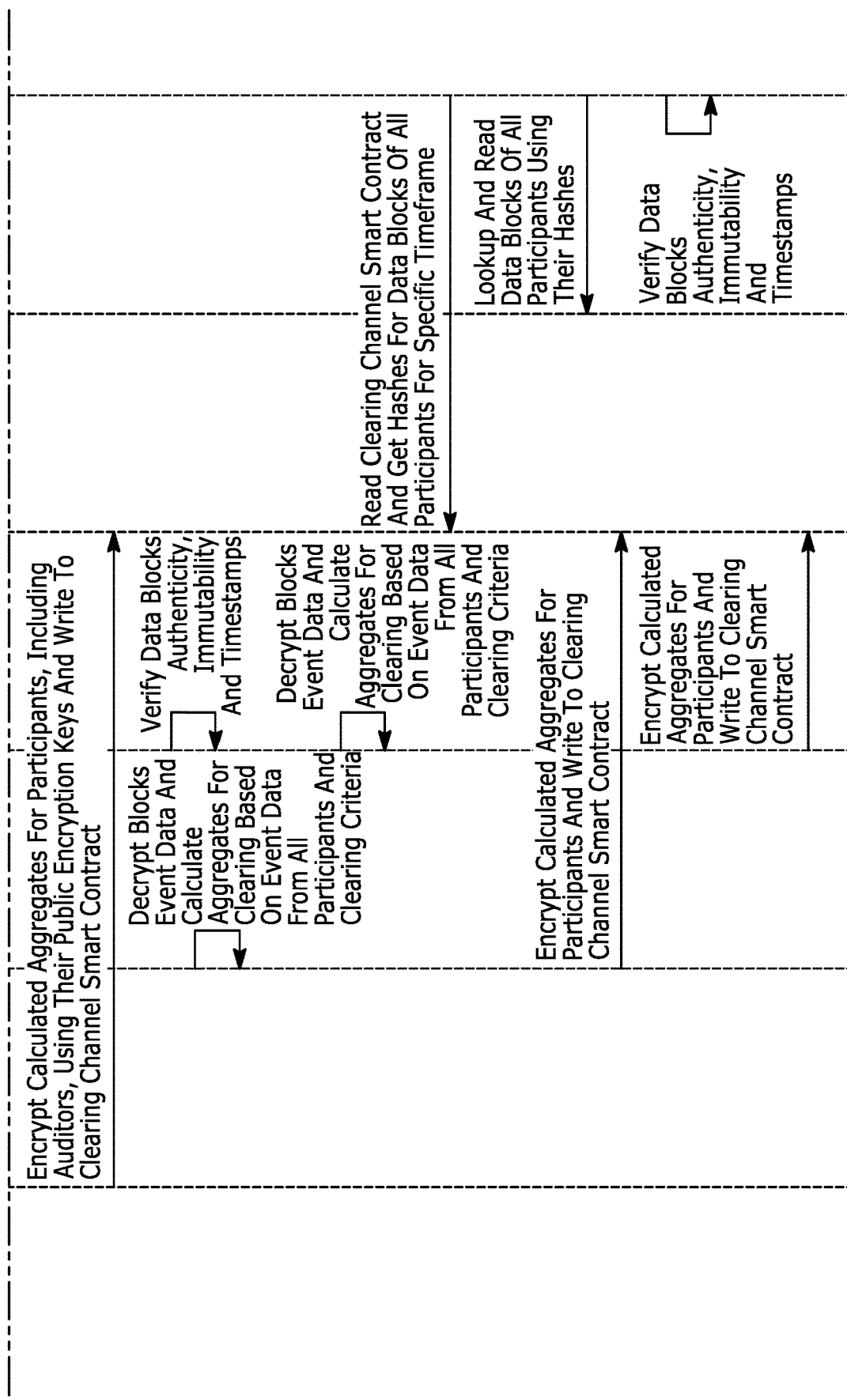
Figure 4D:
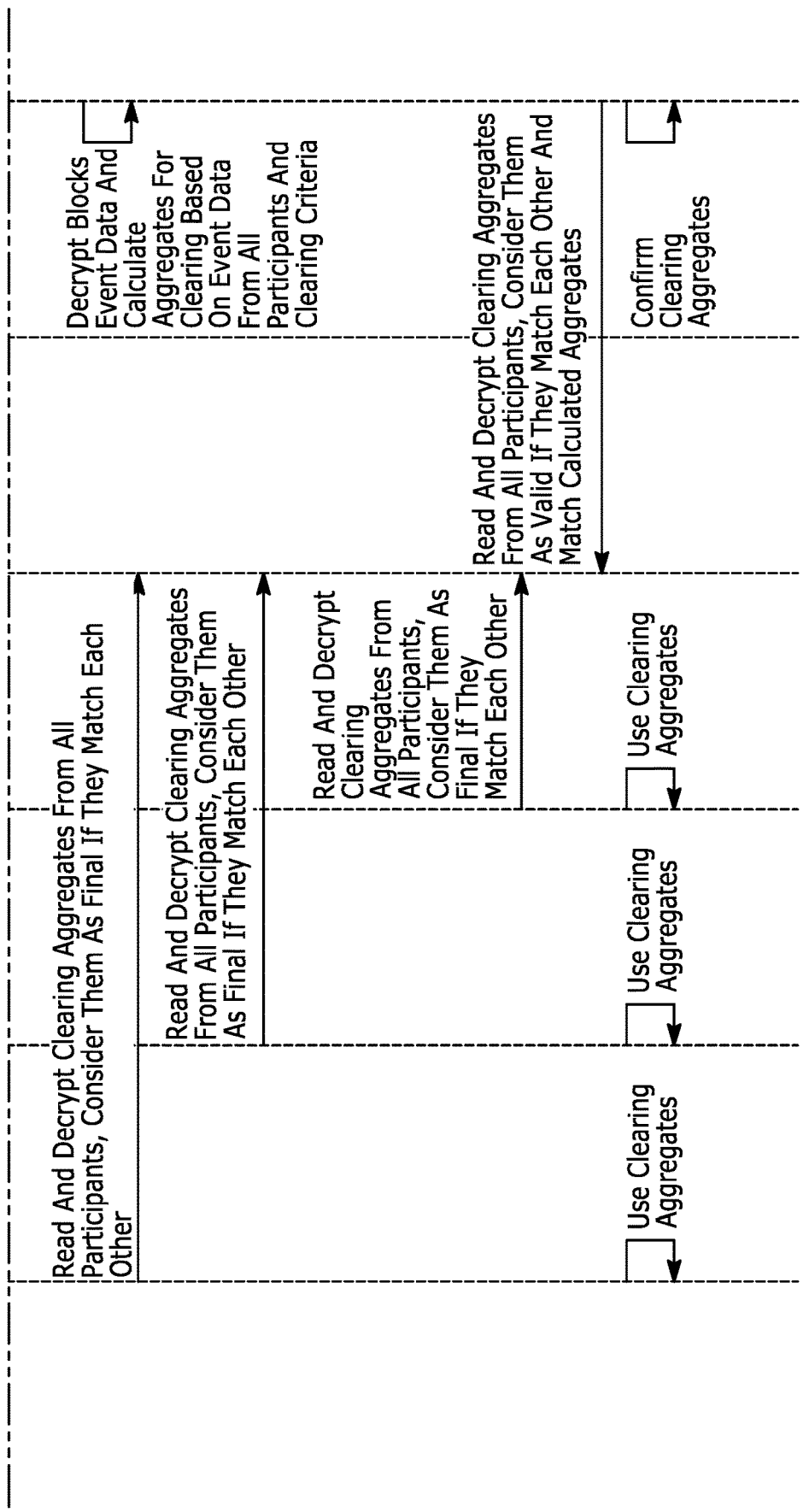

FIG. 3. Interaction diagram for decentralized identity registration and approval, data block reporting and audit, identity blockchain address and encryption public key revocation procedures. Diagram illustrates a method of scalable audit event data collection for electronic trading systems and measurement systems to ensure event data availability, authentication, immutability, trusted timestamping, identification of participants and permissioned read access.

FIG. 4. Interaction diagram for setup of data clearing agreement smart contract between plurality of trading systems and measurement systems, clearing data block reporting by participants, data blocks clearing consensus protocol and audit procedures. Diagram illustrates a method for secure data clearing between electronic trading systems according to pre-agreed clearing criteria.

Figure 5:
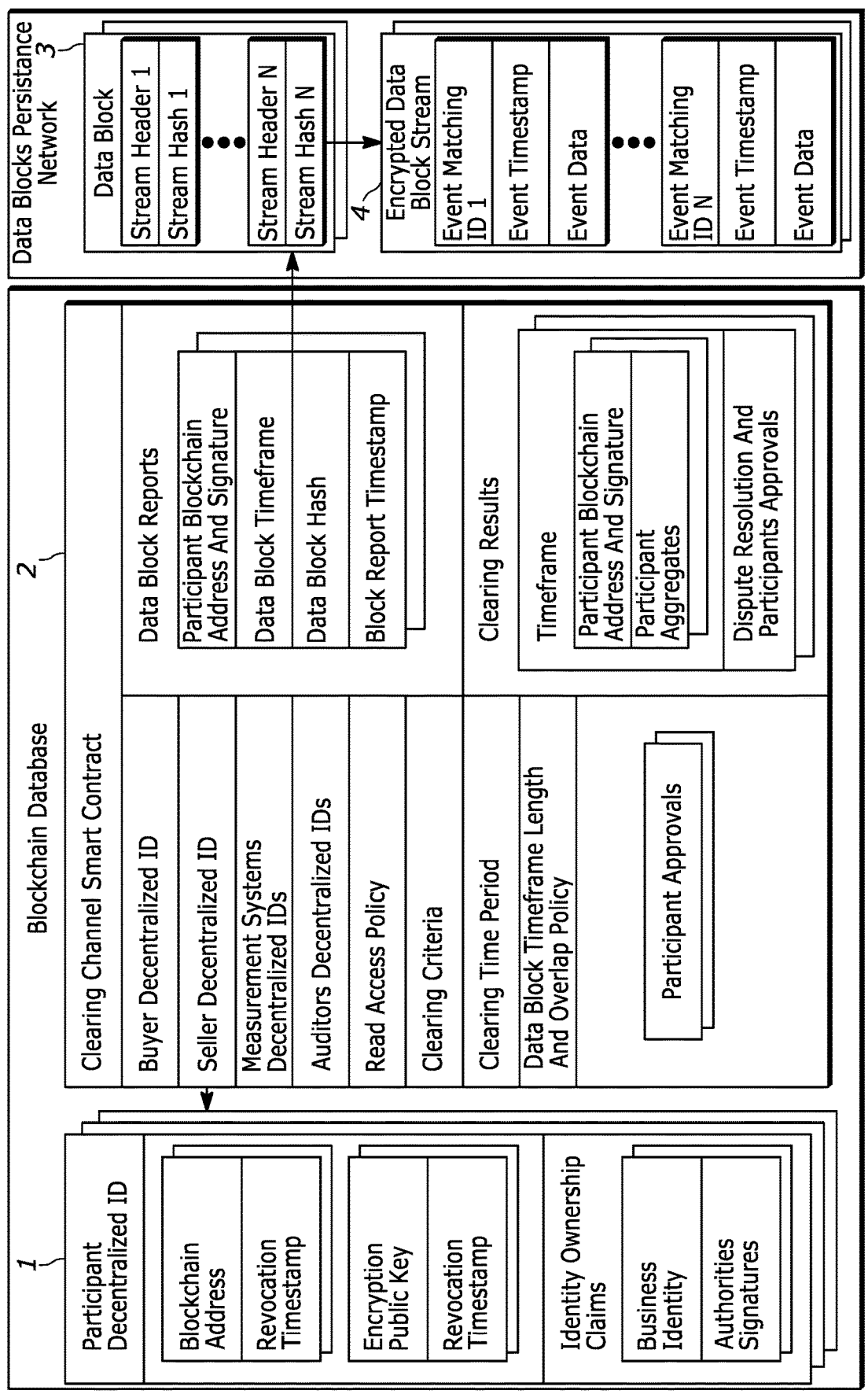

FIG. 5. Data layout diagram for a method for secure data clearing between electronic trading systems according to pre-agreed clearing criteria.

Figure 6A:
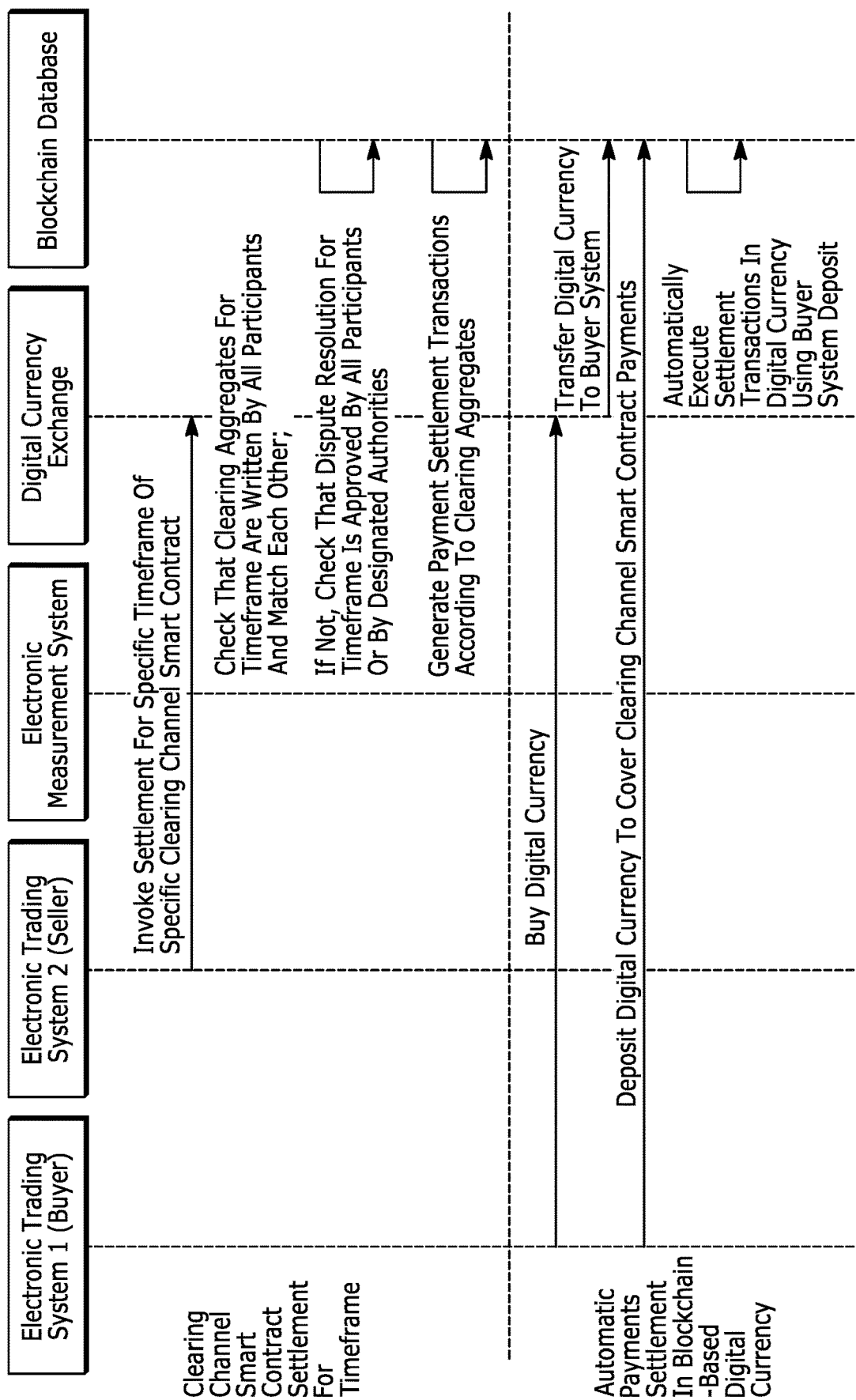
Figure 6B:
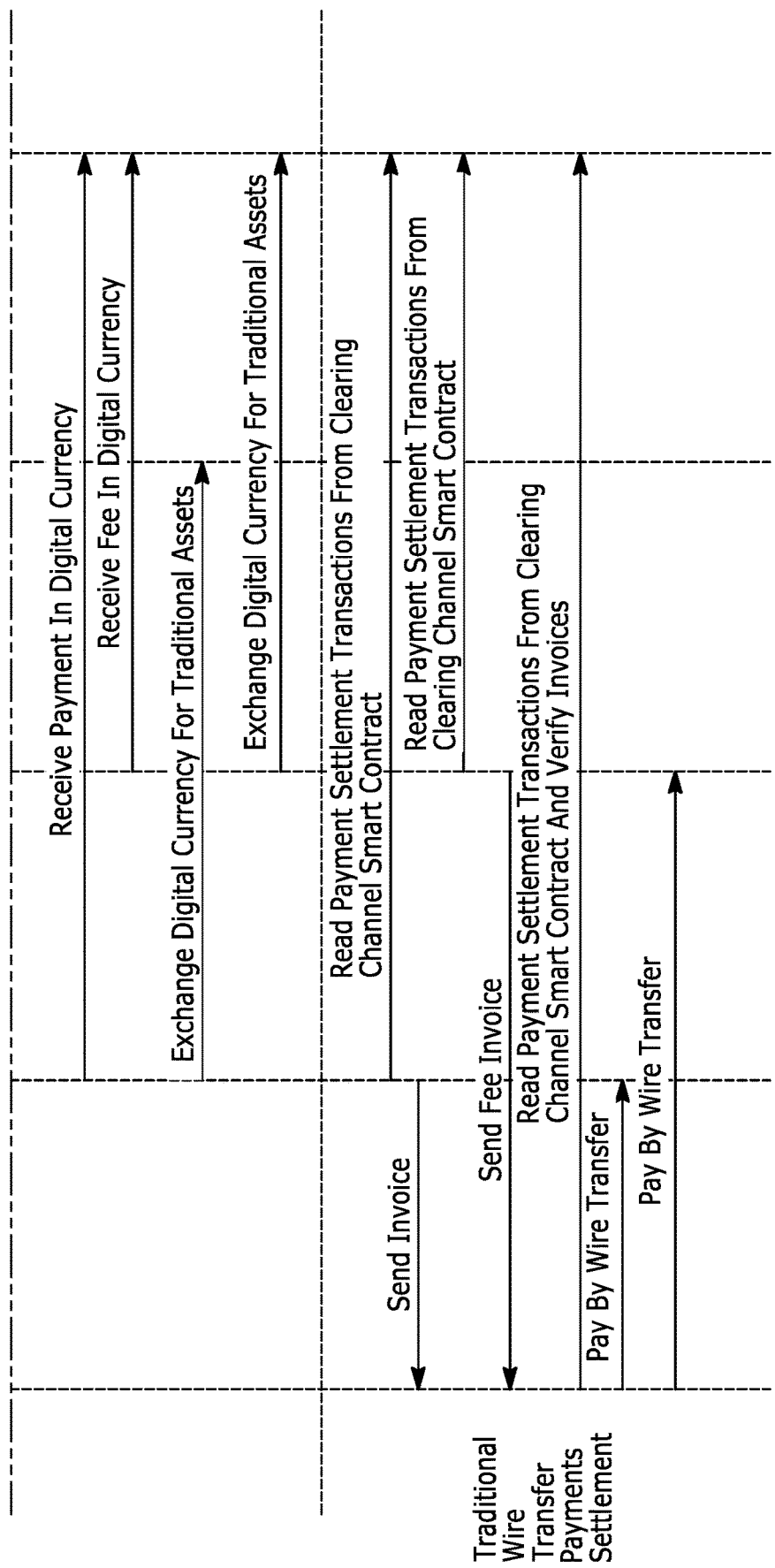

FIG. 6. Interaction diagram for automatic payments settlement between plurality of trading systems and measurement systems based on payment data clearing using blockchain-based digital currencies or traditional wire transfers. Diagram illustrates a method for automatic payment transactions settlement based on payment data clearing between electronic trading systems.

Figure 7:
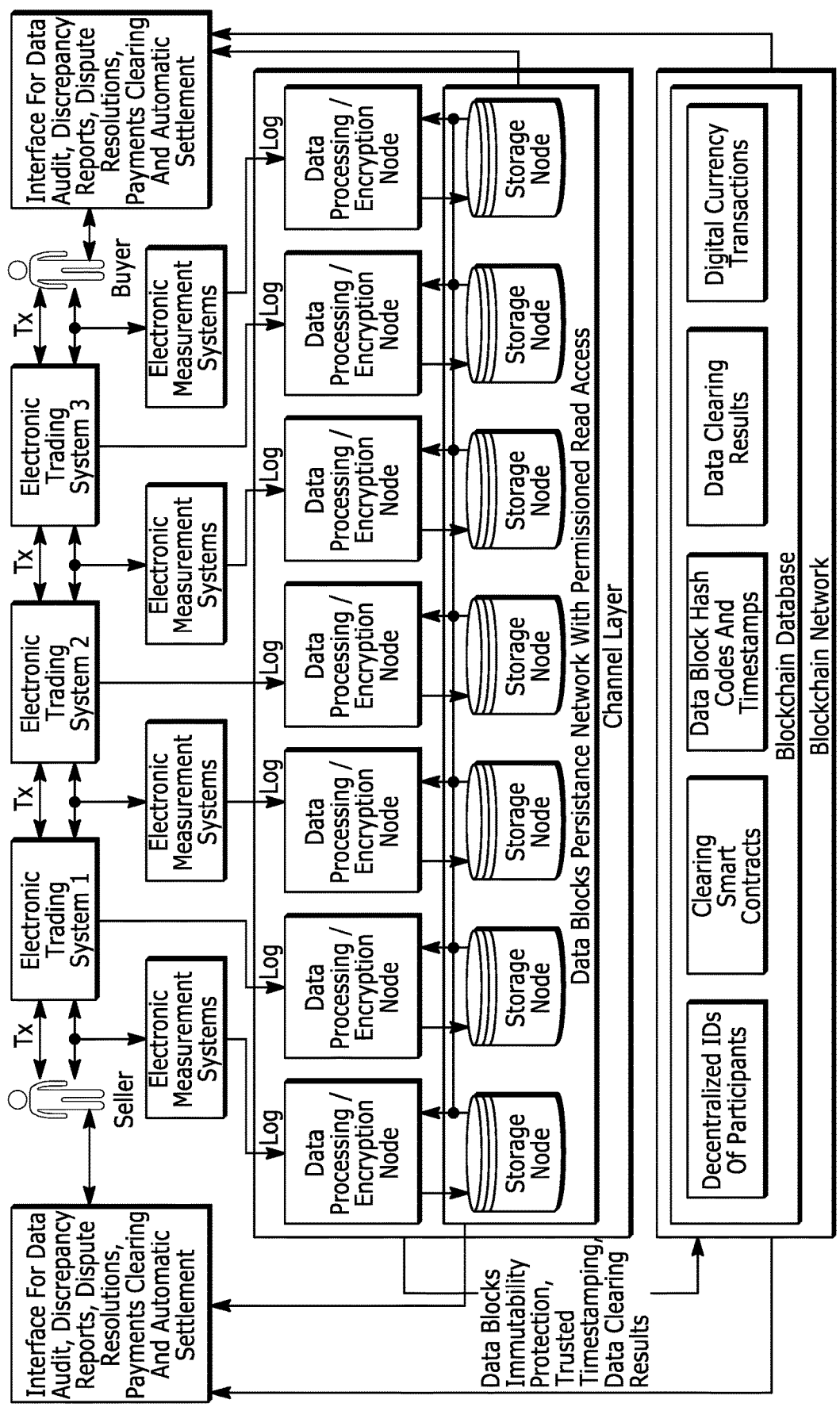

FIG. 7. Block diagram of exemplary architecture for audit and payment clearing of electronic trading systems accompanied with electronic measurement systems.

Figure 8:
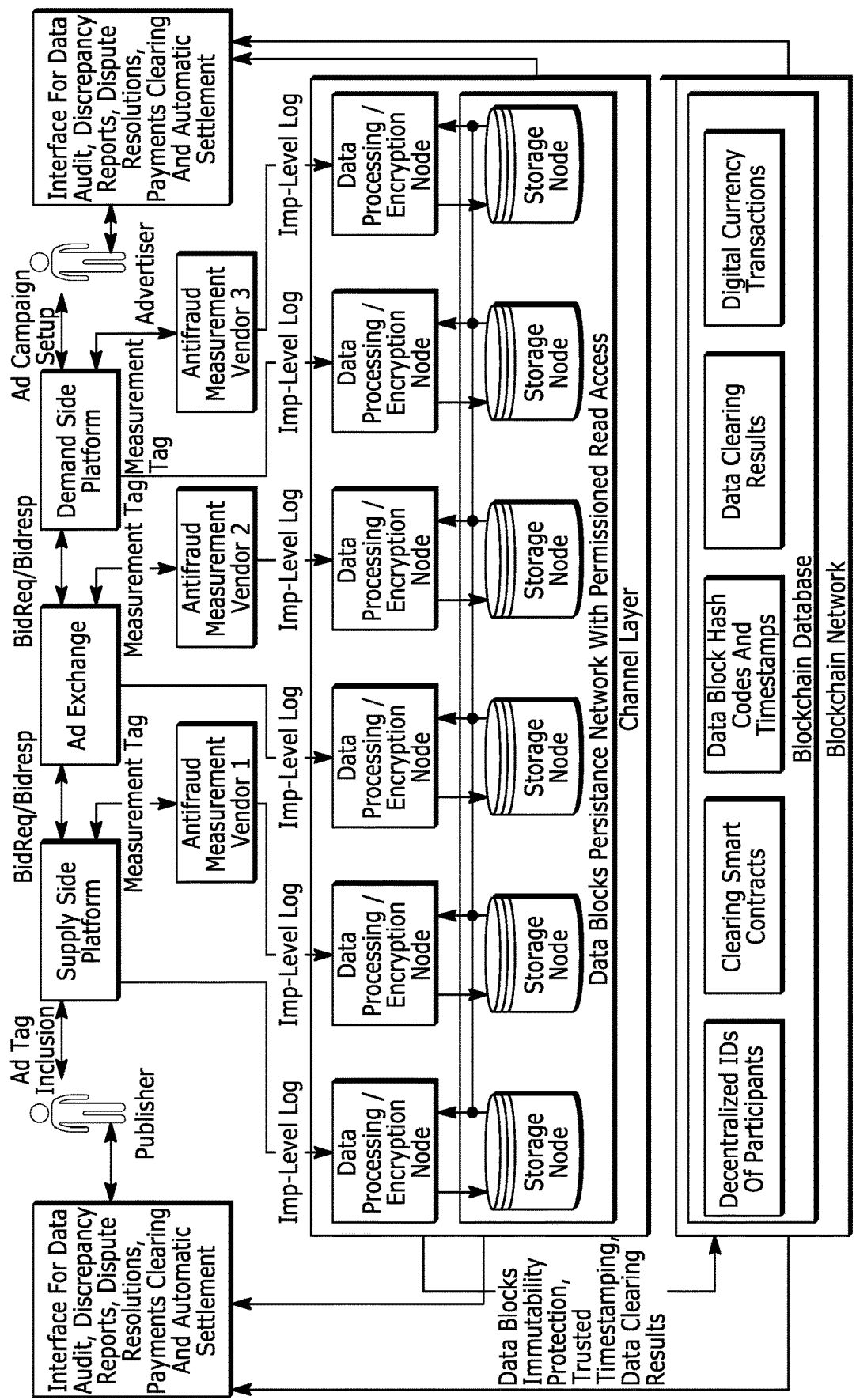

FIG. 8. Block diagram of exemplary architecture for audit and payment clearing of programmatic advertising systems accompanied with antifraud measurement systems.

Figure 9A:
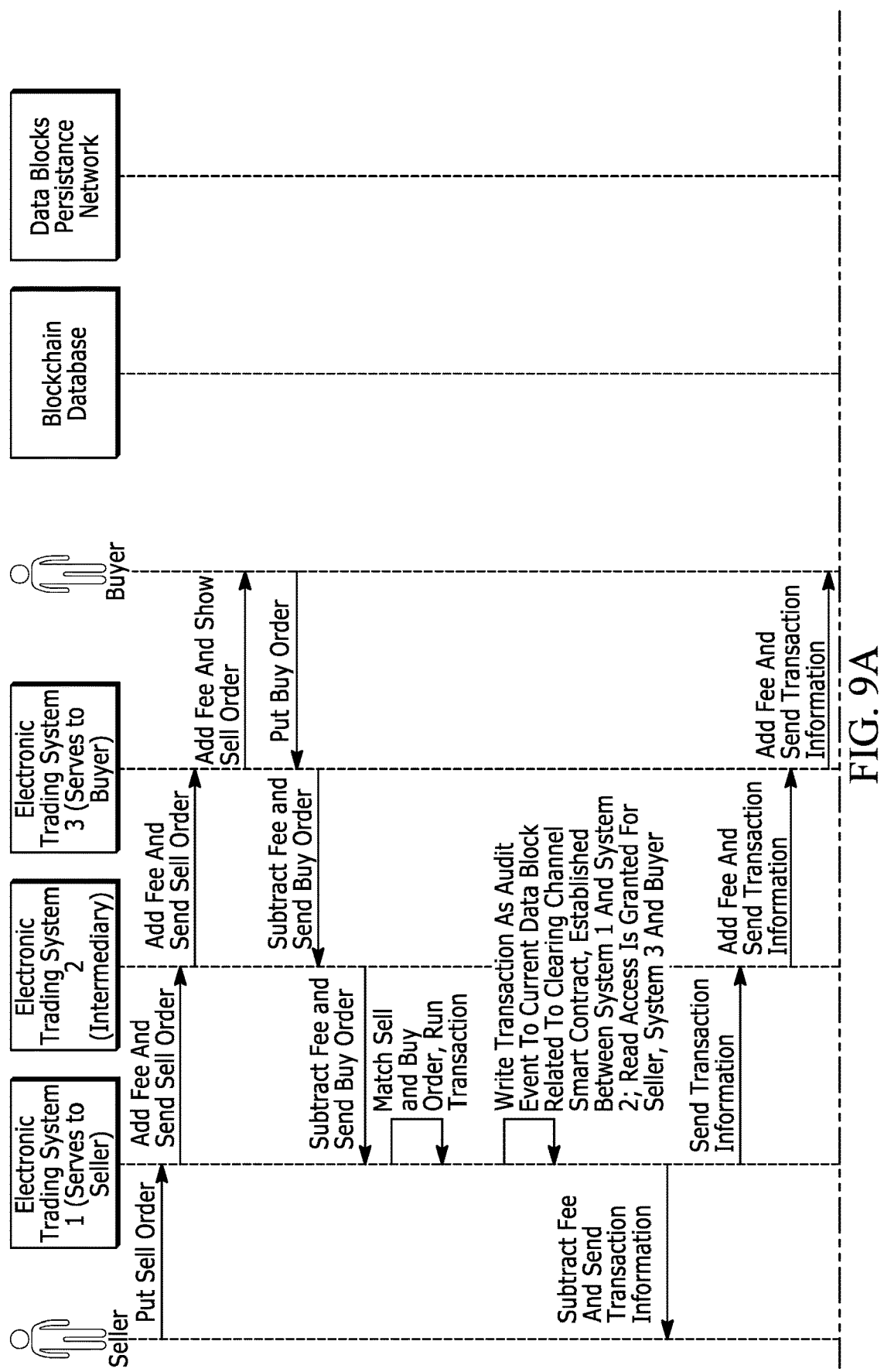
Figure 9B:
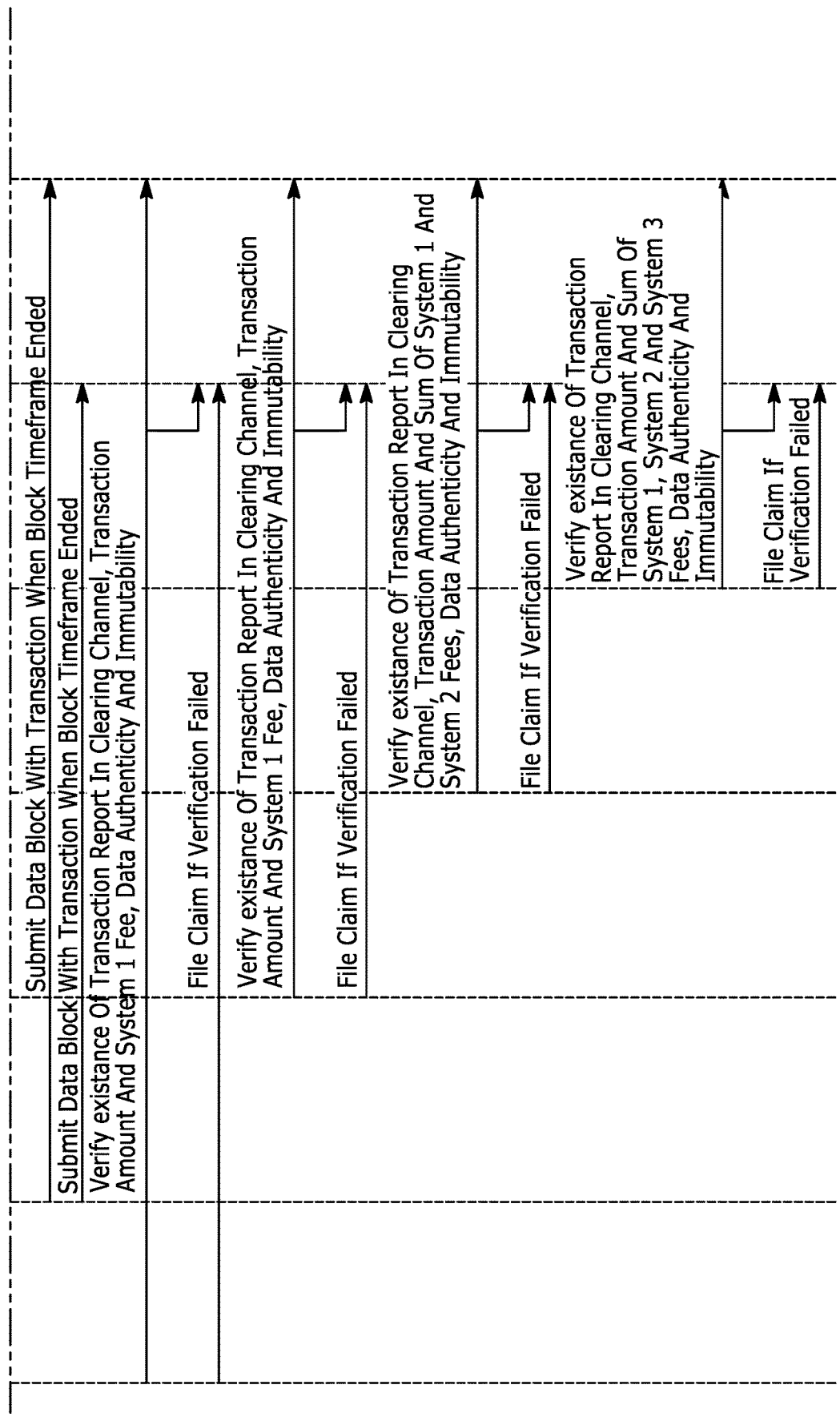

FIG. 9. Exemplary interaction diagram for verification of electronic trading system fees and transaction amount reporting. Diagram illustrates a method to detect payment discrepancies, such as hidden fees and rebates, within the chain of trading platforms used as intermediaries between the buyer and the seller.

Figure 10A:
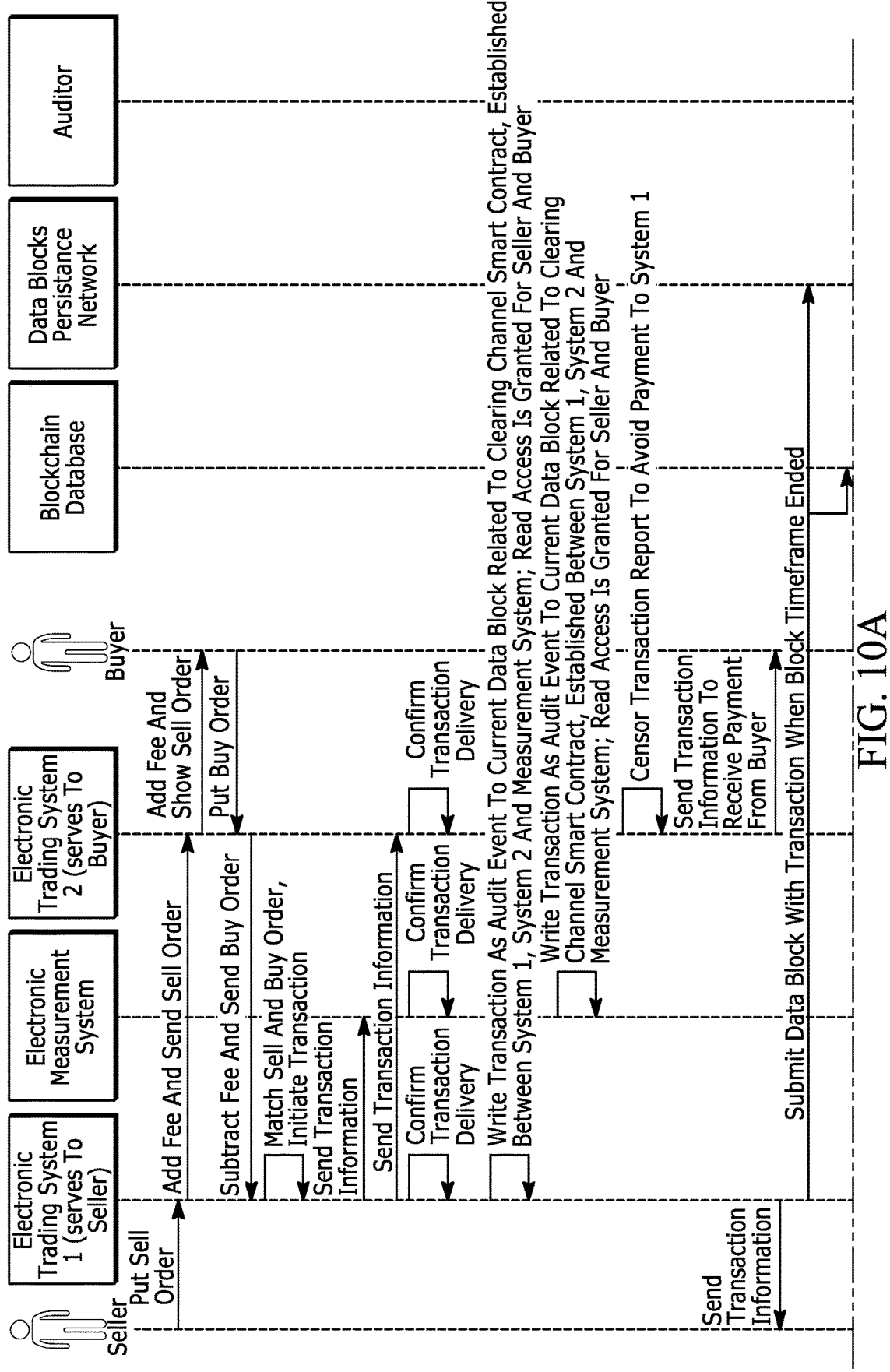
Figure 10B:
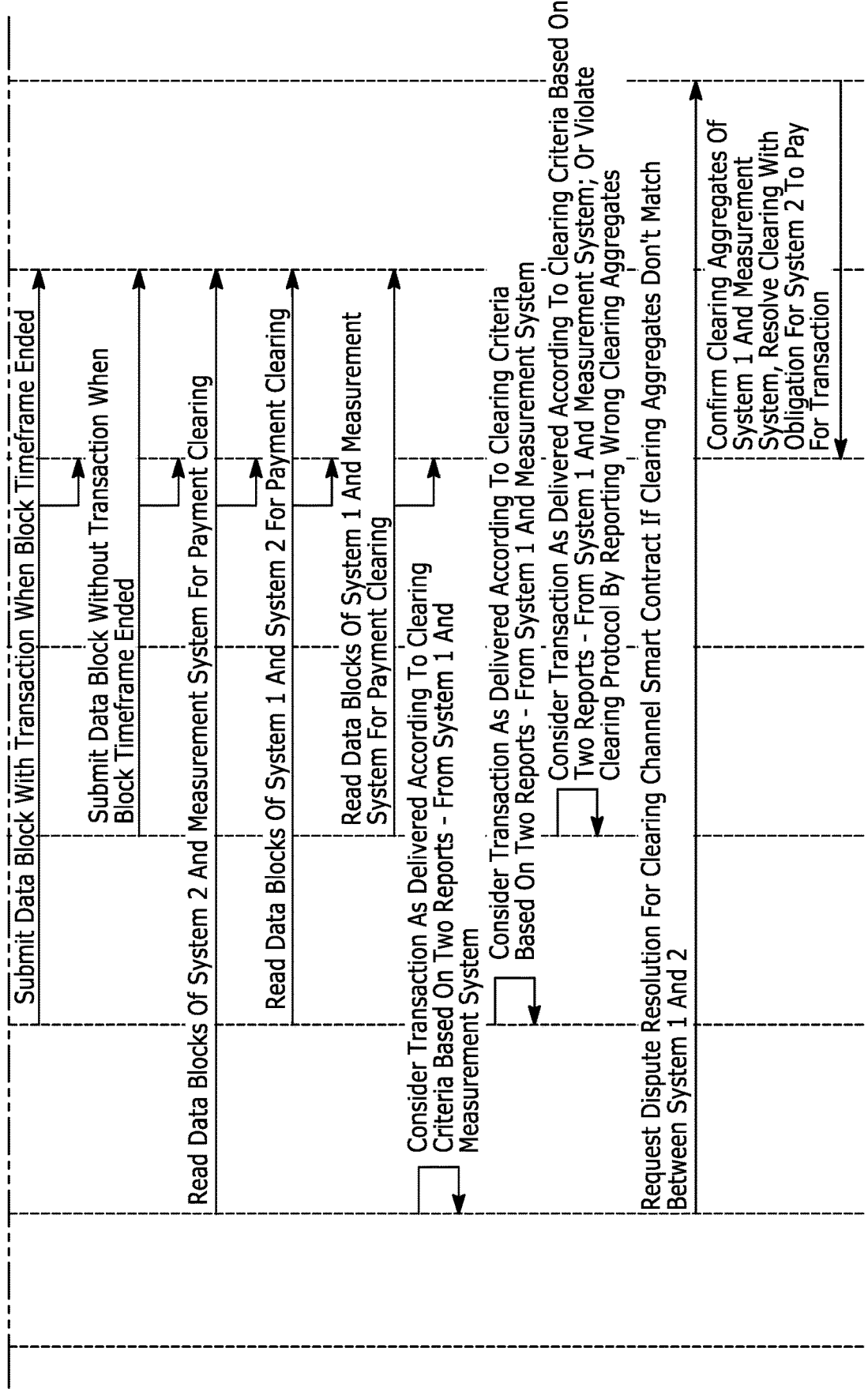

FIG. 10. Exemplary interaction diagram for enforcement of transactional payment, when buying trading system attempts to censor transaction reporting with the goal of payment reduction. Diagram illustrates a method to detect event report censorship by electronic trading systems.

Figure 11A:
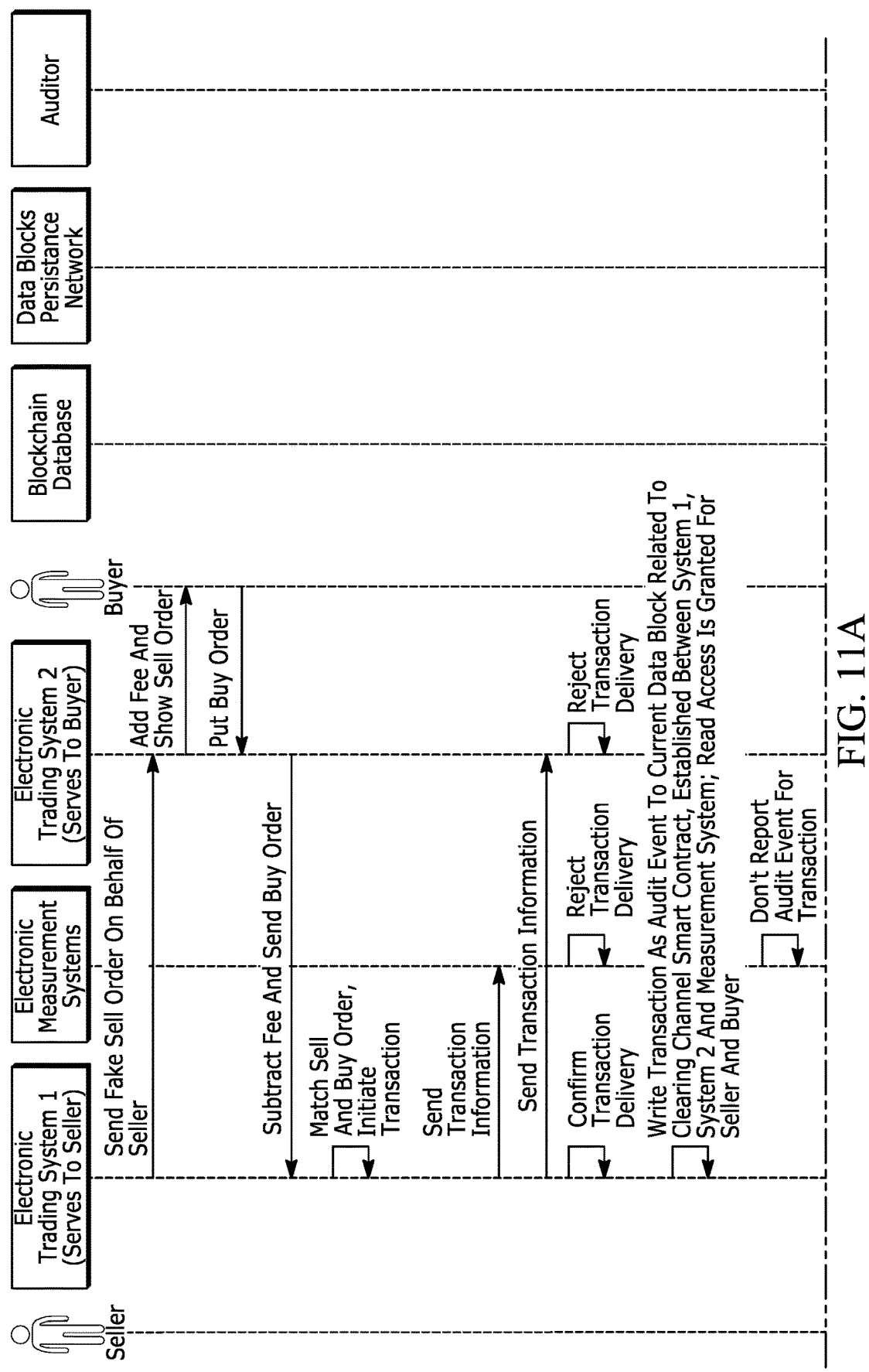
Figure 11B:
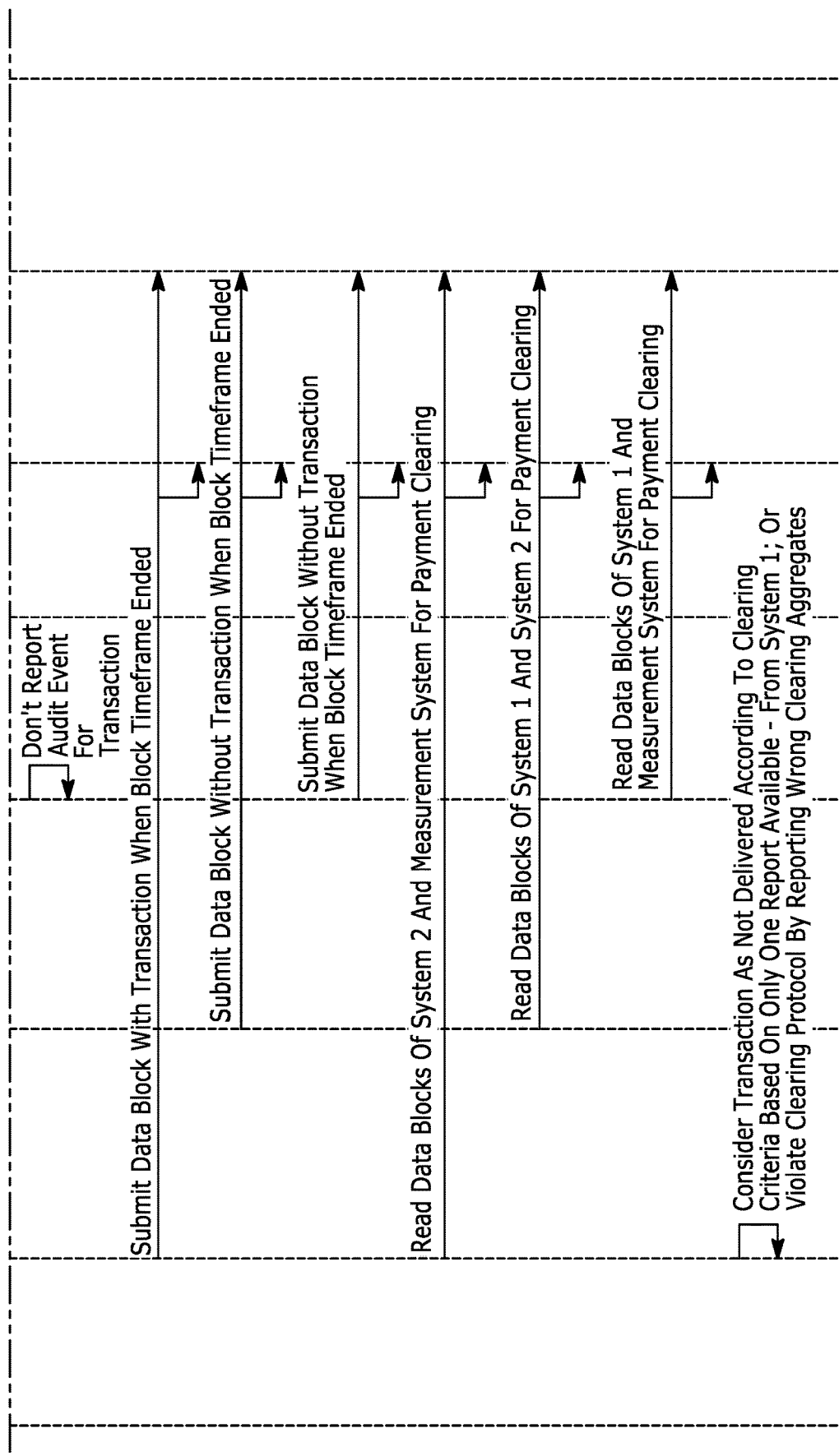
Figure 11C:
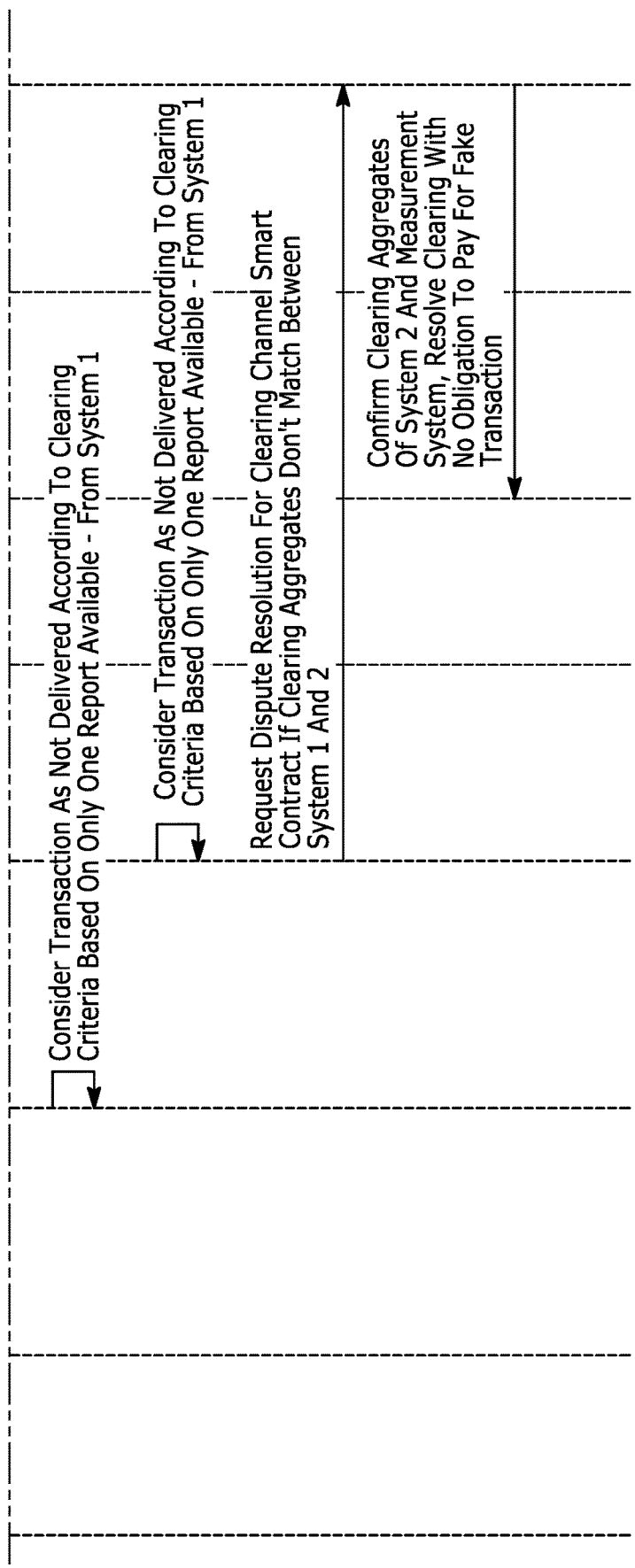

FIG. 11. Exemplary interaction diagram for correct payment enforcement when selling trading system attempts to generate fake transaction reports to increase buyer payment. Diagram illustrates a method to detect fake event reporting by electronic trading systems.

Figure 12A:
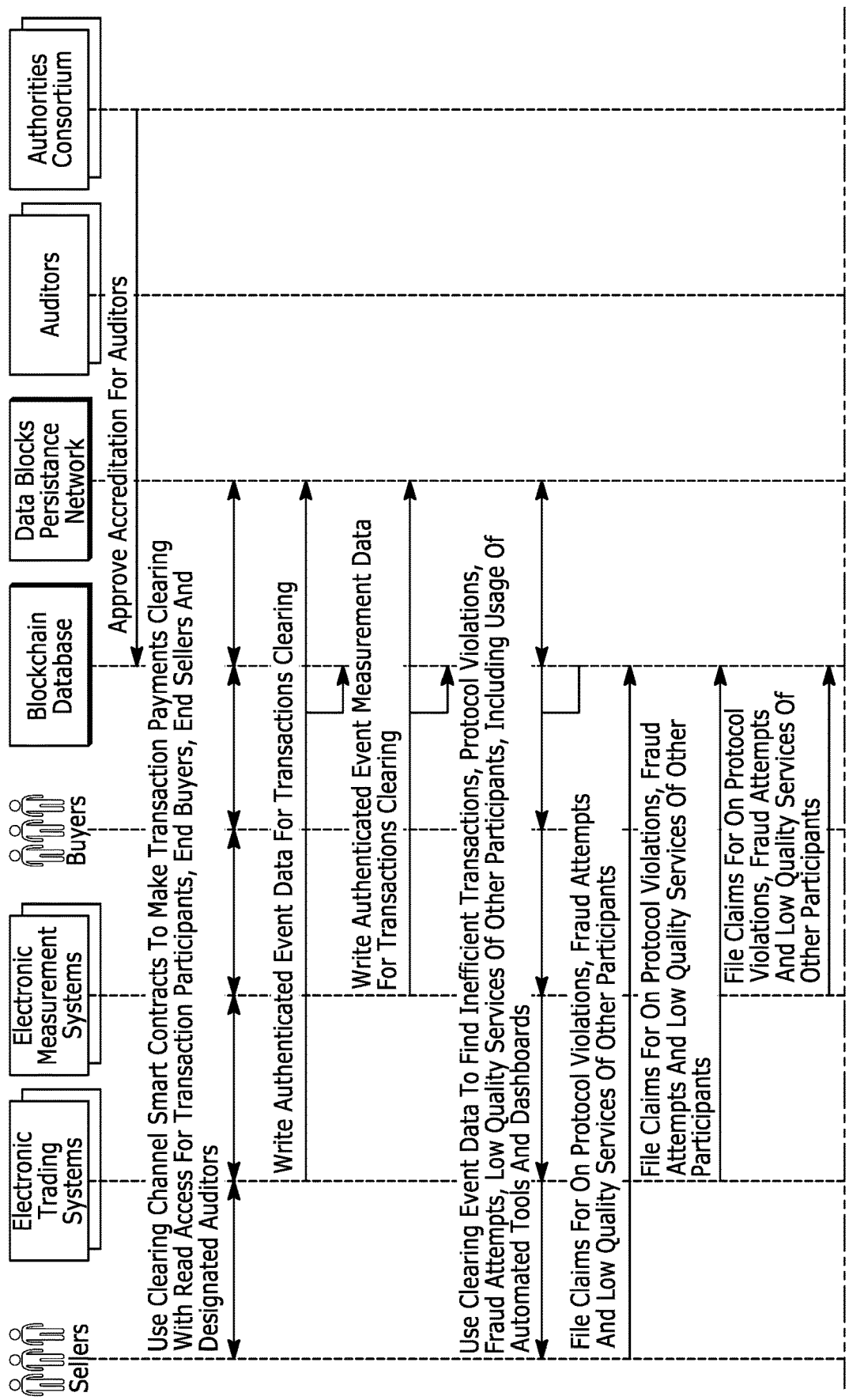
Figure 12B:
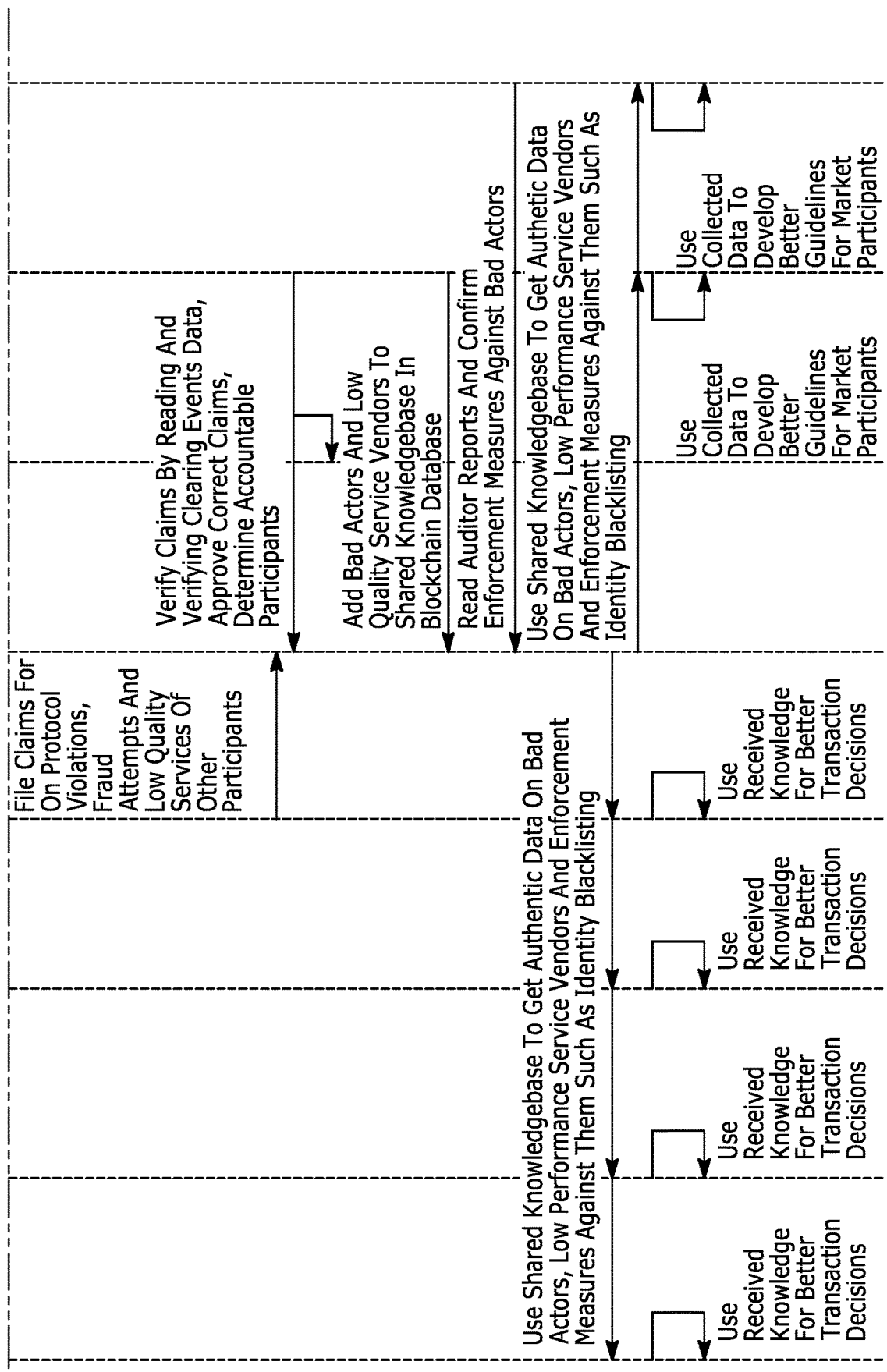

FIG. 12. Interaction diagram of continuous audit of trading platforms based on electronic measurement systems and auditors reporting, with shared knowledgebase maintained by auditors and authorities for bad actors and low performance service vendors detection, exposure and accountability. Diagram illustrates a method for continuous audit of trading systems, detection and exposure of bad actors and low performance suppliers.

Figure 13A:
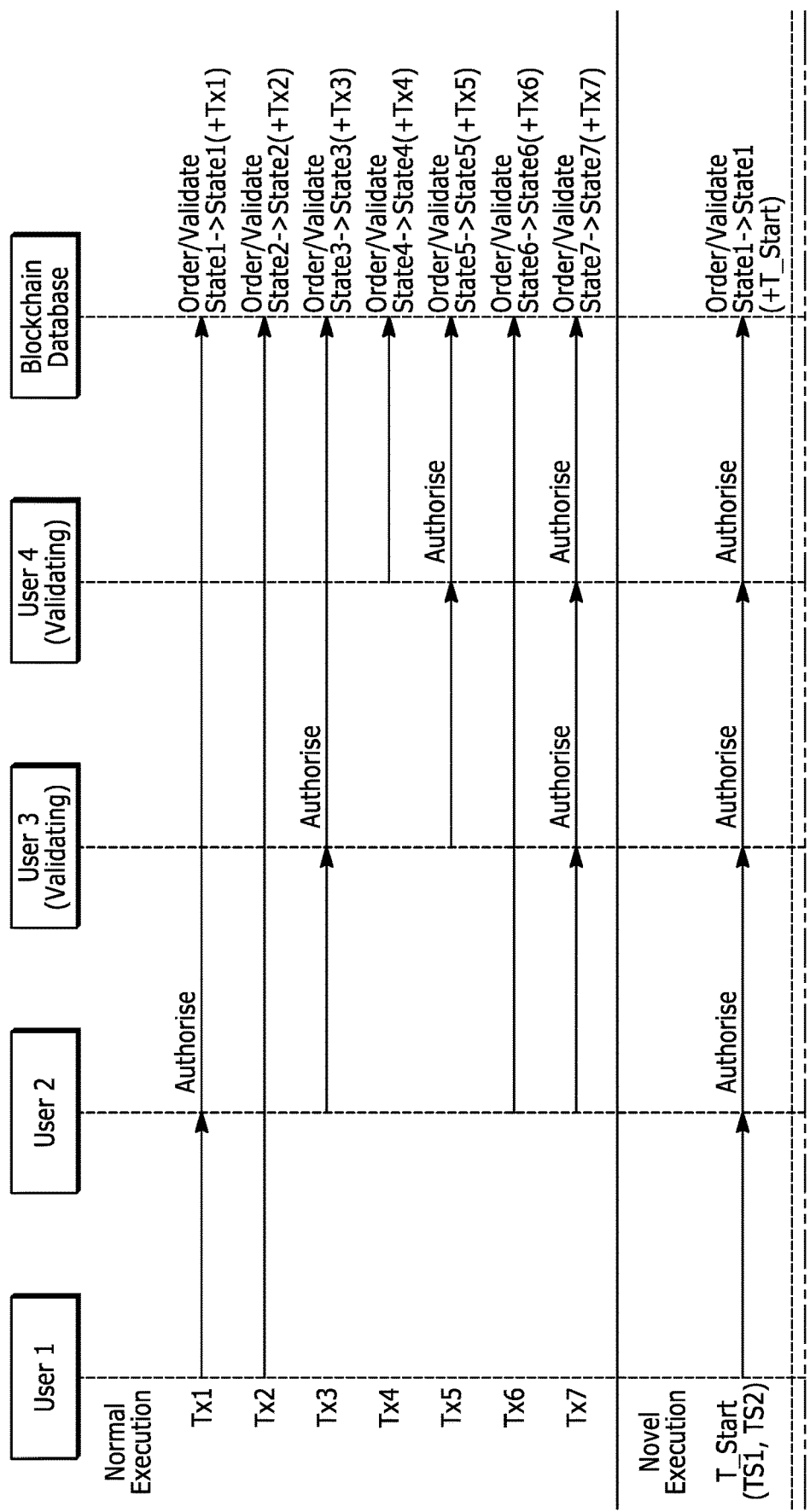
Figure 13B:
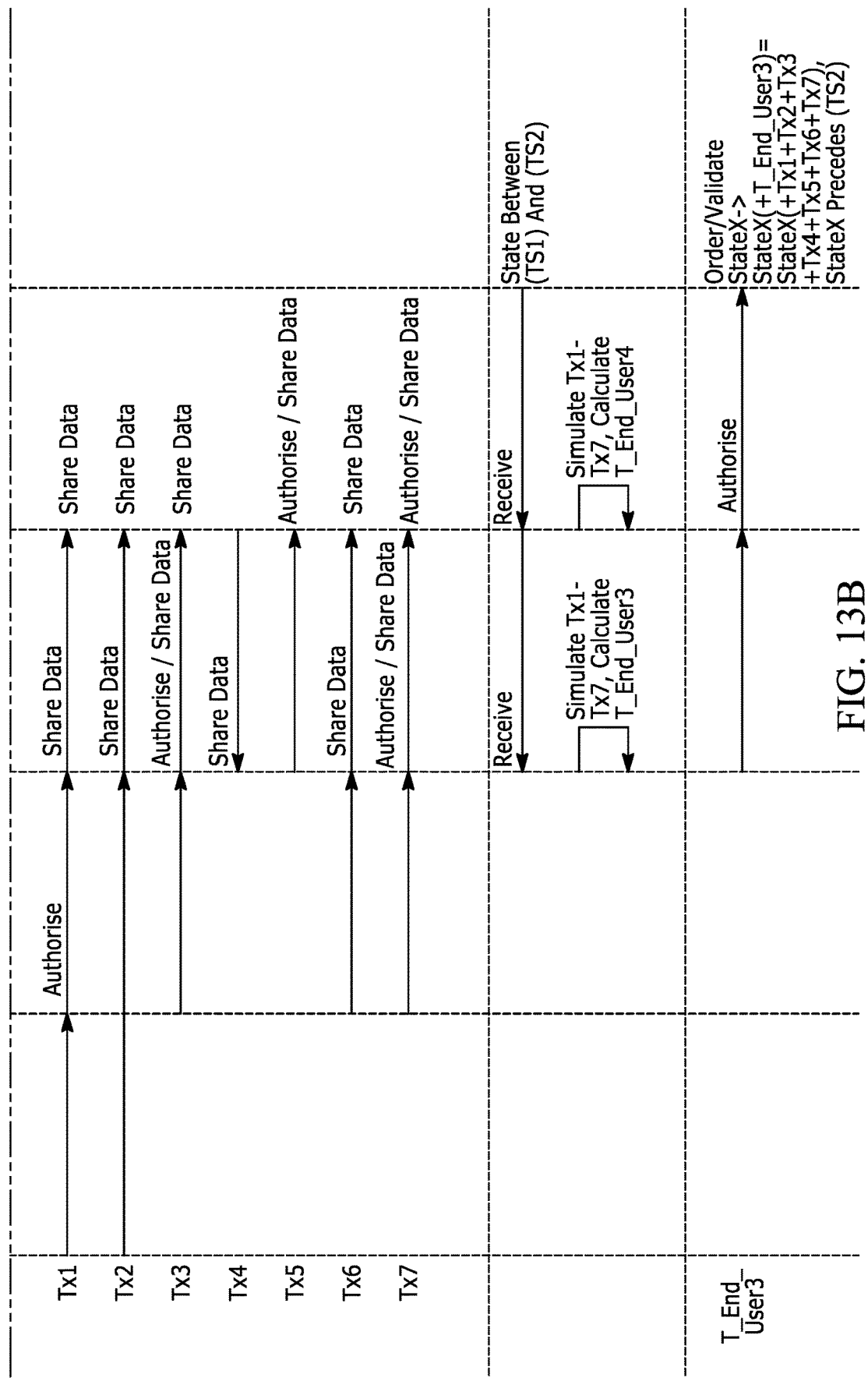

FIG. 13. Interaction diagram of novel method of processing for finite transaction series between subset of blockchain database users for hypothetical use case with four users executing seven transactions between each other.

DETAILED DESCRIPTION

The following detailed description presents a description of certain example embodiments to assist in understanding the novel methods and systems. However, one may practice the present invention in a multitude of different embodiments as defined and covered by the claims.

It is desirable to use blockchain technology in programmatic advertising to create secure protocol of ad events reporting, collection, storage and processing, maintained as distributed and fault-tolerant system by plurality of interested parties, which will ensure collection of programmatic ad campaign performance data and supply chain cash flow data from plurality of programmatic suppliers and measurement/verification systems, with the goal of analysis of this information to eliminate bad practices and enforce suppliers accountability for malicious activities.

It is desirable to allow independent auditors to verify collected data on ad campaigns in programmatic supply chain with cryptographically secure evidence basis, which will allow them to identify accountable participants and prove, if their behavior was following the protocol and pre-agreed policies or not.

It is desirable to use blockchain technology in financial exchanges to create secure protocol of trade events reporting, collection, storage and processing, maintained as distributed and fault-tolerant system by plurality of interested parties, which will ensure collection of trading data and supply chain cash flow data from plurality of trading brokers/suppliers, with the goal of analysis of this information to eliminate bad practices and enforce suppliers accountability for malicious activities.

It is desirable to provide highly granular access control to collected data as participants have complex legal and regulatory compliance framework, which will require implementation of granular data access policies, including events data and blockchain transactional data.

It is desirable to use different data types in an online blockchain ledger for entering and distributing to advertising market participants, information from the industrial associations, organizations, arbitrators and rating agencies on permanent and temporal happenings such as identified events of malicious activity, ratings, performance and availability status of programmatic suppliers. This data will help buyers to optimize ad buying routes and chose suppliers according to current ecosystem state.

It is desirable to implement a common blockchain network for government authorities and industrial authorities to determine validity of permits for participants to operate within the ecosystem. It will lead to cleanup of the market from bad actors.

It is desirable to have a trusted and proven low cost financial platform for identifying, charging, and maintaining balances for advertising market participants to make automatic payments for ad campaigns and supplier fees. This platform can save huge amount of operational costs currently imposed for cross-border payments and their reconciliation/clearing.

Other desirable features and characteristics of the present invention will become apparent from the subsequent detailed description of the invention and the appended claims, taken in conjunction with the accompanying drawings and this background of the invention.

FIG. 1 illustrates block diagram of a system, where method for authentication, immutability and trusted timestamping for large audit event logs of electronic systems may be practiced, and data layout scheme for blockchain database and audit data storage. Electronic System (1) is a trading system, such as financial exchange or programmatic advertising exchange, or any other electronic system, which generates audit log files for events data, which should be available for external audit or usage, such as buy orders, sell orders, exchange transactions. Event data includes event payload, which describes event, and timestamp. Audit Event Log storage (2) is local, remote or cloud storage system of Electronic System (1), where audit log files are stored. This storage can be implemented as file system or database with satisfying performance and availability requirements. Event Log Reporter (3) is a software component, running in local, remote or cloud environment with access to Audit Event Log storage (2), which constantly monitor state of this storage or receive state updates from the storage and sends new audit log event entries to the Data Processing Node (4). Data Processing Node (4) is a software component, connected with Audit Log Reporter by network connection and application programming interface (API) to process audit event log updates. Data Processing Node (4) performs the following main functions: a) verify authenticity of Event Log Reporter and receive audit events; b) determine, to which Data Block (13) event should belong by its timestamp and according to configuration of Data Block creation time periods (event shall belong to the Data Block if and only if Data Block period includes event timestamp; Data Blocks are generated sequentially for separate time periods, for example, for every hour in the day); c) create Data Blocks consisted of multiple audit events related to specific time period in memory cache with failover protection; d) finalize Data Blocks when new events are not expected for them, for example, when several hours elapsed since Data Block events time period ended and no new events are expected to appear in Audit Event Log storage with event time belong to Data Block time period; e) store Data Blocks in Audit Data Blocks Storage (6); f) use Security Module (5) to generate and sign Data Block registration transaction for blockchain database; g) submit Data Block registration transaction to Blockchain Node (7) connected to Blockchain Network (8). Security Module (5) is separate software module running in secure environment with access to blockchain database private key of Electronic System (1) owner. Security Module (5) has an API call to generate signed Data Block registration transaction, this call receives Data Block cryptographic hash such as SHA-3 and other necessary Data Block metadata from Data Processing Node (4). Once Blockchain Node (7) receives Data Block registration transaction, it forwards the transaction to other blockchain nodes within Blockchain Network (8) according to network communication protocols. If transaction passes Blockchain Network (8) consensus protocol, it becomes appended to Blockchain Database (9), jointly maintained by Blockchain Network nodes, each having own copy of the database. As Blockchain Network (8) there might be used any Blockchain Network, if its trust model is convenient for Electronic System owner. For example, private or consortium Hyperledger (https://www.hyperledger.org) blockchain network; consortium or public Ethereum (https://ethereum.org) blockchain network. Trust model of blockchain network ensures protection of transaction authenticity (secure proof that transaction was made by identity, which possess specific pair of cryptographic public and private keys), immutability (transaction cannot be changed or removed from blockchain database after it is made), trusted timestamping (transaction receives current timestamp, when it is added to blockchain database, this timestamp cannot be forged, changed or removed) and verification of transaction against constraints such as double spending protection for financial transactions. Group of components (10) should to be operated within private infrastructure of Electronic System (1) to avoid private key leakage or interruption of local audit data logs processing. Event Log Reporter (3), Audit Data Blocks Storage (6) and Blockchain Network (8) might be operated by external parties with specific requirements and service level agreements. Audit Data Blocks Storage (6) is storage system or storage network, which provide required level of data availability and enforce required access control policy. Images (12) and (13) illustrate data layout. Blockchain Database contain Data Block registration transactions issued by Data Processing Node, which include such data as Electronic System Blockchain Address which match Electronic System owner public key, Data Block time period, Data Block cryptographic hash, transaction timestamp and transaction signature (12). Data Block (13) contains audit event data, which includes event descriptions and timestamps. External Auditor (11) with access to blockchain network and specific block data can verify and make proofs for: who reported the Data Block (block report transaction signature verification in blockchain), when Data Block was created and reported (not later than timestamp of transaction inclusion block in blockchain database) and whether available Data Block content is not corrupt (calculated Data Block cryptographic hash is identical to the hash stored in blockchain database).

FIG. 2 illustrates block diagram of a system, where method for storage of large audit event logs reported by electronic platforms with enforced availability, authentication, immutability, trusted timestamping, and permissioned read access may be practiced, and data layout scheme for blockchain database and audit data storage. On the diagram X and Y numbers depend on chosen Data Block time period size, number of new events generated per second and amount of parties with specific read access restrictions. Typically, X is expected to be below 1 000 000. For example, if events in the Data Block represent transactions of 1000 buyers and 1000 sellers, where each buyer have at least one transaction with each seller, and both buyers and sellers shall have read access only for their own transactions, then number of Streams required is equal to number of buyers multiplied by number of sellers. Depending on number of new events per second and Data Block period, Y can reach hundreds of millions, for example. This diagram has several extensions to previously described FIG. 1. Electronic System (1), Audit Event Log storage (2) and Event Log Reporter (3) represent the same entities as in FIG. 1. Data Processing Node (4) and Security Module (5) functions are extended with data encryption for permissioned read access. On FIG. 2 Data Processing Node (4) performs the following main functions: a) verify authenticity of Event Log Reporter and receive audit events, where each event includes accompanying list of identified systems, which should be able to read this event data (identification of systems may be based on their public keys, cryptographic certificates or Decentralized IDs); b) determine, to which Data Block (13) event should belong by its timestamp and according to configuration of Data Block creation time periods (event shall belong to the Data Block if and only if Data Block period includes event timestamp; Data Blocks are generated sequentially for separate time periods, for example, for every hour in the day); c) create separate Data Blocks parts, called Streams, for each unique list of systems, which should have read access to some subset of Data Block events (two events go into the same Stream if and only if they have exactly the same set of systems with read access); d) fill Streams with received audit events related to Data Block time period in memory cache with failover protection; e) finalize Streams when new events are not expected for them, for example, when several hours elapsed since Stream events time period ended and no new events are expected to appear in Audit Event Log storage with event time belong to Stream time period; f) lookup into configuration files, traditional database or blockchain database for encryption public keys of systems, which should have read access to created Streams by using their identifiers; g) use Security Module (5) to generate random storage key for each finalized Steam, which represent elliptic curve point (for example, use secure random generator to generate point on secp256k1 curve; take x coordinate of the point and convert it into 256-bit number in big-endian format); h) use Security Module (5) to encrypt finalized Streams for each Data Block with generated storage keys using symmetric encryption, for example 256-bit AES/CBC/PKCS5Padding algorithm with initial vector equal to 0x0; (h) for each Stream use Security Module (5) to encrypt Stream storage key using asymmetric encryption for all encryption public keys of systems, which shall have access to Stream event data, and save resulting cryptogram as Stream header, so that each system with requested read access will be able to decrypt Stream storage key from Stream header (for example, to use less storage for Stream headers, encrypt storage key with modified ElGamal algorithm, where secret value is encrypted for multiple elliptic curve key pairs and resulting cryptogram has size of 33*(N−1) bytes, where N is the number of key pairs; input of encryption algorithm: (i) 256-bit secret value equal to storage key K, generated as described in point (f) above, (ii) N encryption public keys P1, PN as points on elliptic curve secp256k1, (iii) secure hash function H over scalar field of secp256k1 such as SHA-3, (iv) G—base point of secp256k1; steps of the algorithm: (i) convert secret value (storage key) to a point on elliptic curve secp256k1 using secret value as x coordinate with positive y coordinate, deterministically obtaining message point M=(Mx,My) by solving elliptic curve equation for y, (ii) compute secret s=H(K), (iii) compute C0=s*G, (iv) for each PX in P1, PN compute CX=PX*s+M, (v) encode points C0, . . . , CN into resulting cryptogram using 33 bytes per each point); i) compose Data Blocks out of encrypted finalized Streams and their headers received from Security Module (5) and store them in Audit Data Blocks Storage (6); j) use Security Module (5) to generate and sign Data Block registration transaction for blockchain database; k) submit Data Block registration transaction to Blockchain Node (7) connected to Blockchain Network (8). Security Module (5) is separate software module running in secure environment with access to blockchain database private key and data encryption private key of Electronic System (1) owner. These two keys are used for Electronic System (1) authentication and data encryption respectively. Security Module (5) has the following API calls used by Data Processing Node (4) to implement its functions: a) data Stream encryption; as an input this call receives data Stream and a list of encryption public keys for systems, which shall have data Stream read access; securely generates storage key for received data Stream; encrypt data Stream using generated key; generate data Stream header by asymmetrically encrypting storage key, so that it can be decrypted from the header using encryption private keys corresponding to received list of encryption public keys; returns encrypted data Stream and its header to the caller; b) generation of Data Block registration transaction for blockchain database; as an input this call receives Data Block cryptographic hash such as SHA-3 and other necessary Data Block metadata; generates signed Data Block registration transaction for the blockchain; returns transaction data to the caller. As Data Blocks are created for sequential timeframes, read access for specific participant cannot be revoked by reporter for already created Data Blocks, but it can be revoked for new Data Blocks. Blockchain Node (7), Blockchain Network (8) and Blockchain Database (9) perform same functions as in FIG. 1. Group of components (10) should be operated within private infrastructure of Electronic System (1) to avoid private keys leakage, audit data leakage and interruption of local audit data logs processing. Audit Data Blocks Storage (6), Audit Data Blocks Persistence Network (14) and Blockchain Network (8) may be operated by external parties with specific requirements and service level agreements without risk of event data confidentiality compromise as all events data is encrypted before leaving Data Processing Node (4). Audit Data Blocks Persistence Network (14) allows any interested party to find Data Block or Stream content by its cryptographic hash using peer-to-peer discovery protocol, download it and maintain local copy, making Data Blocks and Streams encrypted content available to all interested parties connected to the storage network. Audit Data Blocks Storage (6) is one of storage nodes. Interested parties can monitor Data Block registrations in blockchain database and download these Data Blocks content to maintain their copy and avoid potential loss of data availability in case if data is removed from other storage nodes. Storage network may be operated using IPFS protocol. Images (12), (13) and (15) illustrate data layout. Difference with FIG. 1 here is in usage of encrypted Streams inside Data Blocks for permissioned read access. Each Stream contain subset of Data Block audit events available to specific unique list of parties with read access, while Stream header contain cryptogram, which allows these parties to get decryption key for the Stream. Both Data Blocks and Streams are addressable in storage network by their cryptographic hashes. External Auditor (11) with access to blockchain network, storage network and read access to specific Data Block provided by Electronic System (1) at the moment of block reporting, can run own storage node to maintain copy of this Data Block of interest and be always able to verify and make proofs for: who reported specific Data Block (block report transaction signature verification in blockchain), when Data Block was created and reported (not later than timestamp of transaction inclusion block in blockchain database), whether available Data Block content is not corrupt (calculated Data Block cryptographic hash is identical to the hash stored in blockchain database) and which audit events were reported in the Data Block (decrypted Stream data contains original audit event reports, to decrypt Stream Auditor use his encryption private key in the following way: (i) get Stream header and split into N+1 33-byte segments, where N is the number of parties having read access to the Stream; (ii) use 33-byte segments to construct C0, . . . , CN secp256k1 elliptic curve points; (iii) for each CX in C1, . . . , CN perform El Gamal decryption for pair (C0, CX) with own encryption private key to obtain secret value sX and message point MX=(MXx, MXy); (iv) for each pair (sX, MX) verify if it is correct by checking if sX is equal to s1=H(MXx), where H, as mentioned above, is secure hash function over scalar field of secp256k1 such as SHA-3; (v) if read access is allowed, one of pairs (sX, MX) will be correct and value sX in this pair will be equal to the correct Stream storage key; (vi) use obtained storage key to decrypt Stream content).

FIG. 3 illustrates exemplary interactions for electronic system decentralized identity registration and approval, data block reporting and audit by independent auditor, identity blockchain address revocation, identity encryption public key revocation. This diagram further illustrates previously described method for storage of large audit event logs reported by electronic platforms with enforced availability, authentication, immutability, trusted timestamping, and permissioned read access. Identity Registration. 1) To perform decentralized identity registration Electronic System operator generates unique own blockchain address, its private key, pair of public and private encryption keys for data access; then creates self-sovereign Decentralized ID registration transaction, which includes information on ID owner business entity, such as company name and registration number, generated public encryption key, and potentially other claims such as list of domain names belonged to ID owner; then Electronic System signs this transaction with blockchain private key and submits to blockchain database. 2) To prove identity claims to other systems, Electronic System requests Decentralized ID ownership verification from one of designated Authorities, such as bank, which can verify identity by doing Know Your Customer process, or national body, responsible for corporate registries. 3) Authority verifies provided documents, which prove relationship of Electronic System operator to Decentralized ID business entity, and possession of Decentralized ID private key by Electronic System operator. If verification succeeds Authority runs blockchain transaction under own private key to confirm Decentralized ID ownership by specific business entity. Similar process is used for confirmation of other Decentralized ID claims such as domain names ownership. Data Block Submit: Electronic System defines which parties shall have read access to its reported data in Data Block. For each party Electronic System lookup into its Decentralized ID to find its encryption private key. After necessary encryption keys are available the process is the same as described above for FIG. 2. Data Block Audit with reporter identification and authentication, data timestamp and immutability verification. External Auditors can verify multiple security properties for reported Data Blocks. 1) Auditor verifies Data Block immutability and timestamp by calculating its cryptographic hash and looking up for Data Block hash registration in blockchain database. If hash registered in the blockchain match calculated hash, then Data Block content is correct and its data was not changed since the timestamp of registration transaction (trusted timestamp). 2) Auditor verifies Data Block reporter authentication and identity by looking up for Decentralized ID using block registration transaction originator blockchain address and checking, if ownership of Decentralized ID is confirmed by known Authority. 3) If Data Block is valid and Auditor have read access, it uses own encryption private key to decrypt Data Block content and have ability to verify raw audit events data. Revoke Blockchain Address by Data Block reporter. If blockchain address private key is lost or compromised, Decentralized ID owner shall have ability to revoke this key and register new one. To do so Data Block reporter executes blockchain transaction, which writes into Decentralized ID entry stored in blockchain database, that starting with timestamp of this transaction new blockchain address shall be considered as active for Decentralized ID and old address shall not be considered as valid. To avoid identity stealing in case of blockchain address compromise this change is confirmed by Authority upon request of ID owner. To verify Data Block submit transaction ownership, Auditor checks that used blockchain address was active at the moment of Data Block registration transaction for specific Decentralized ID. Revoke Encryption Public Key by Auditor. If Auditor or some other party needs to change encryption key pair for data access due to compromise or other reasons, it invokes blockchain transaction to replace old key pair with new one. This transaction is signed with authenticated blockchain address private key of Auditor and hence don't require confirmation from external Authorities. When doing Data Block encryption, reporters get only active encryption keys of Decentralied IDs with read access.

FIG. 4 illustrates exemplary interaction diagram for setup of data clearing agreement smart contract between plurality of trading systems and measurement systems, clearing Data Blocks reporting by these systems, clearing consensus protocol and audit procedures. These processes are core elements of a method for secure data clearing between electronic trading systems according to pre-agreed clearing criteria. Clearing Channel Agreement Setup. Plurality of electronic trading systems, which make trading transaction between them, can agree specific criteria, how they are going to pay each other for transactions and how they will verify if specific transaction is eligible for payment. The criteria may require that both trading systems and specific independent measurement system shall confirm transaction by reporting it as audit event to make it eligible. Other criteria combinations are possible, such as making transaction eligible if selling system and at least two connected measurement systems confirm it. This flexibility allows parties to agree criteria, which they consider as sufficient for abuse prevention. Also trading systems may agree upfront, which Auditors shall have access to their data and be able to resolve potential disputes over clearing results. Trading systems agree, which timeframe period should be used for audit Data Blocks used for clearing and how this period shall be aligned, for example, timeframes shall start at midnight of specific date and have 1-hour length. Longer timeframe period decreases amount of Data Blocks, amount of transactions in the blockchain network, and computational overhead, but increases latency of clearing. All agreed parameters, including list of participating systems, clearing criteria, timeframe period, list of systems with read access rights and rights to resolve clearing disputes, are combined into Clearing Channel Smart Contract (CCSC) and this contract is written into blockchain database by originator. Upon deployment of CCSC, originator notifies other participants, for example, Electronic Trading System 2 (Seller) and Electronic Measurement System on FIG. 4. Both systems read CCSC content from blockchain database and confirm it by invoking blockchain transaction using own registered blockchain address. As a result, blockchain database contain evidence of all registered parties accepting CCSC parameters and it is made legally binding by having appropriate legal agreements in place. Data Blocks Submits. After CCSC is approved by all participants, each participant starts making Data Blocks with relevant audit events for each completed timeframe and submitting them into Audit Data Blocks Persistence Network and Blockchain Database. During timeframe period participants collect event data for Data Blocks, each event data includes unique event ID to match its data between participants. After timeframe is completed all participants have predefined time to make Data Block submit. This process is the same as described for FIG. 2 and FIG. 3, where read access is provided to other participants and designated external Auditors. Data Block registration transactions are made in blockchain database with reference to CCSC. If reporting systems have deviation in timestamping source, it may affect correctness of event matching between systems as same event data of different systems may fall into Data Blocks for different timeframes. To avoid this issue, systems can write events to Data Block for specific timeframe not only when they have timestamp belonged to timeframe period, but also when they fall into specific overlap period before and after timeframe, for example, 5 minutes before and after timeframe. Using proper event matching algorithm when calculating clearing results over Data Blocks for specific timeframe with 5-minute overlap periods, systems will avoid incorrect clearing results even when timestamps for events in different systems deviate for up to 5 minutes. For example, events matching by unique event ID is applied to Data Blocks reported by participants for specific hour, which include data for 5 minutes before and after this hour, and event is considered as belonged to the hour if earliest timestamp reported by participants for the event belong to the hour, otherwise event is accounted in another timeframe. This algorithm allows to use all matched event data for clearing and avoids duplicate accounting for the events, if reported timestamps for the event differs not more than on 5 minutes. Data Blocks Clearing Consensus and Audit for specific timeframe. When specific timeframe is completed and all participants made their Data Block submits for this timeframe, participants start clearing consensus protocol to achieve agreement over timeframe clearing result. To do so Data Processing Node of each participant makes lookup into blockchain database to receive cryptographic hashes of other participants Data Blocks. Using these hashes, Nodes locate Data Blocks content in Data Blocks Persistence Network, and read it. As a result, every participant receives all Data Blocks for specific timeframe. To avoid protocol compromise, participants check that received Data Blocks are authenticated, immutable and valid. For each Data Block they decrypt raw events data and then calculate clearing aggregated result for the timeframe by applying clearing criteria to all available raw events data with events matching between different participants based on unique event IDs, for example, calculating payment sum for eligible events (transactions). Protocol assumes there, that all parties are interested to have automatic clearing consensus and keep their Data Blocks available until consensus protocol is completed or at least one of parties make copy of Data Blocks from other parties upon their reporting. If one of Data Blocks is not available at the moment of clearing consensus, then automatic clearing consensus becomes impossible and dispute resolution is required. Each participant submits calculated clearing aggregated result into blockchain database in encrypted form with reference to CCSC. Encryption of clearing result is made with asymmetric encryption algorithm to provide access only for CCSC participants and parties with read access, for example using modified El Gamal algorithm described above, same way as for Data Block Stream storage keys. During predefined period of time after timeframe completion, all participants shall report clearing results calculated by them. When all clearing result reports are submitted, any participant or other party with read access can verify if participants achieved clearing consensus for the timeframe by reading submitted reports, decrypting them and checking if they are equal to each other. If results are equal, then they can be safely used for billing and other purposes as they represent authenticated proof of consensus of CCSC participants. Auditor with read access can verify clearing results, by calculating them on his side the same way as CCSC participants do it. It allows participants to involve external Auditors in dispute resolution around clearing results, when results between one or more participants don't match each other. In that case Auditors can resolve disputes by providing their own verification and clearing results for CCSC timeframe and submitting them into blockchain database with CCSC reference. As a result of described process, all participants of CCSC and designated Auditors are identified, have access to event data of others to make clearing statements and after agreeing CCSC neither party can: (a) change agreed clearing criteria; (b) tamper with event data of others to influence clearing outcome; (c) tamper with own event data after it was reported to influence clearing outcome; (d) make event data unavailable after it is reported to influence clearing outcome; (e) repudiate from previously reported own event data; (f) report wrong clearing result to influence clearing outcome without falsification being detected.

Inclusion of independent Measurement Systems as CCSC participants between Selling and Buying systems allow them to reach agreement over payment clearing results as these $3^{rd}$ parties act as independent arbiters providing own event observations as additional clearing data source. If there is risk of collusion between some of CCSC participants, parties should look for inclusion of more independent participants into CCSC to ensure higher level of clearing consensus security.

FIG. 5 illustrates data layout used for secure data clearing between electronic trading systems according to pre-agreed clearing criteria as described above. Each participant has own Decentralized ID (1) registered in blockchain database. Decentralized ID includes its active blockchain address together with blockchain address revocation records, where revocation timestamps are equal to respective timestamps of new address registration transactions. It also includes active encryption public key of participant together with encryption public key revocation records, where revocation timestamps are equal to respective timestamps of new key registration transactions. Another part of Decentralized ID is devoted to claims, such as ID ownership by specific business identity or domain names ownership by ID owner. These claims are signed by designated Authorities known to other parties, so that they can verify claims validity. CCSC (2) have the following data inside: a) Buyer Decentralized ID; b) Seller Decentralized ID; c) Measurement Systems Decentralized IDs; d) Decentralized IDs for Auditors and other external parties with read access; e) Read Access Policy, which includes agreed extended options regarding data access, for example, access to events data by end-buyer and end-seller, provided based on their IDs derived from event payload, ability to turn off encryption of clearing results to make them publicly available; f) Clearing Criteria, equal to one of clearing result calculation algorithms, supported by Data Processing Nodes of participants, or representing macros written in macro programming language, which describes clearing aggregation algorithm for Data Processing Nodes; g) Clearing Time Period, establishing period of CCSC operations; h) Data Block timeframe length and overlap policy, setting up timeframe configuration for clearing; i) Participant Approvals signed transactions of CCSC participants, approving its configuration; j) Data Block Reports—Data Block reporting transactions by CCSC participants for each timeframe having same data layout as described for FIG. 2; k) Clearing Results, written by participants in encrypted form for each completed timeframe; l) Dispute Resolution and Participants Approvals per timeframe clearing results, used to define clearing result for the timeframe if there were mismatch between results reported by participants, and external Auditors were submitting their clearing result resolution. Data Block (3) and Encrypted Data Block Stream (4) layouts are the same as in FIG. 2, with the exception that all events are supplemented with unique Event Matching IDs, used to match events between Data Blocks of different participants.

FIG. 6 illustrates exemplary interactions for settlement execution with automatic payments in digital currency and with traditional wire transfers, based on data clearing results achieved between electronic trading systems using method for secure data clearing as described for FIG. 4. Clearing Channel Smart Contract Settlement for Timeframe. After CCSC participants achieved consensus over clearing results for specific timeframe, they can use these results to generate payment settlement transactions in blockchain database. There could be two modes of settlement execution: a) with access to settlement transaction data by blockchain network nodes; b) without access to transaction data by blockchain network nodes. In mode (a) to generate transactions in secure manner without ability of participants to influence outcome, best way is to use settlement function pre-agreed and deployed as part of CCSC. Any participant, including Seller, can invoke settlement function for specific timeframe, passing decrypted clearing results from all participants and auditors in an argument. Settlement function verifies that received clearing results have quorum required for settlement (results match each other, or are confirmed by auditors according to agreed dispute resolution policy), encrypts them using participants encryption public keys and verifies that they match encrypted clearing results reported to blockchain database by respective participants. This verification provides strict cryptographic proof that clearing result is obtained according to CCSC pre-agreed criteria. Based on clearing result, settlement transactions are generated, which include amount to be paid from Electronic Trading System 1 (Buyer) to Electronic Trading System 1 (Seller) and amount to be paid from Electronic Trading System 1 (Buyer) to connected Electronic Measurement System. These transactions are saved into blockchain database. Settlement function of CCSC is securely executed according to blockchain network consensus protocol by network nodes. In most consensus protocols it means that execution is validated by all blockchain network nodes and attacker have to compromise majority of them to manipulate transaction results. This trust model allows parties to rely on resulting settlement transaction data. In mode (b) parties can't expose transactional data to blockchain nodes and use the same consensus approach for settlement transactions as for clearing results. Consensus over settlement transactions may be done simultaneously with consensus over clearing result. To do so all participants independently verify clearing results, generate settlement transactions according to pre-defined rules, encrypt transactions using asymmetric algorithm and encryption public keys of participants, and report to blockchain database with reference to CCSC. It creates strict verifiable proof of settlement result, confirmed by identified parties, and if Buyer won't make payments, this proof can be used for legal enforcement. Automatic Payments Settlement in Blockchain-based Digital Currency. One of advantages that blockchain technology offers is ability to use digital currencies, such as Bitcoin, to securely transact directly in blockchain database instead of using banking infrastructure. Digital Currency Exchange offers exchange service to convert traditional assets such as national currencies to digital currencies created by according to decentralized currency issuance protocol and stored in blockchain database. It is expected that some digital currencies with stable price with respect to leading world currencies will become useful instrument for enterprises to transact between each other directly using blockchain database and avoiding costly banking fees. Having clearing and settlement process in place, electronic systems can execute automatic payments in digital currencies. In FIG. 6 example, Electronic Trading System 1 (Buyer) firstly buy digital currency using Digital Currency Exchange service. Digital Currency Exchange receives payment in traditional assets and executes blockchain database transaction to transfer respective amount of digital currency to Electronic Trading System 1 (Buyer). Electronic Trading System 1 (Buyer) deposits necessary amount of digital currency to CCSC, which covers settlement payments. After settlement function of CCSC is successfully executed, Electronic Trading System 2 (Seller) and Electronic Measurement System can receive their payments in digital currency by requesting them from CCSC deposit. To keep privacy of digital currency payments participants may use for them blockchain network, which allow anonymous transactions, such as Zcash (https://z.cash/). In that case Buyer makes private digital currency payments based on settlement transactions. In case if Buyer haven't paid, recipient can raise legal claim, providing settlement result proof. Buyer on his side can prove his payment by exposing private payment transaction to verifier, which can verify its existence in blockchain database. That way CCSC participants keep necessary level of privacy for all stages of data reporting, clearing, settlement and digital currency payments. Automatic Wire Transfer Payments Settlement. When CCSC participants prefer usage of traditional wire transfers for payment, they happen based on settlement transactions as illustrated in the following example. Electronic Trading System 2 (Seller) reads payment settlement transactions from CCSC, generates respective invoice and sends it to Buyer. Electronic Measurement System do the same for its service fee. Buyer verify invoices against settlement transactions in CCSC and, if they match, sends payments by wire transfer. In case if Buyer haven't paid, recipient can raise legal claim, providing settlement result proof. Buyer on his side can prove his payment by exposing wire transactions, confirmed by bank, to verifier.

FIG. 7 illustrates example architecture for audit and payment clearing of electronic trading systems. Here all components described above are displayed altogether in example case, where Seller makes sell orders via Electronic Trading System 1, Buyer makes buy orders via Electronic Trading System 3, Electronic Trading System 1 and Electronic Trading System 3 are decoupled, but transact between each other via Electronic Trading System 2. This case represents typical supply chain with multiple intermediaries. As Buyer and Seller don't trust to trading systems, they require usage of multiple Electronic Measurement Systems, which make own observations of orders and transactions, happening in electronic trading systems. In programmatic advertising such Measurement Systems may be connected into supply chain by embedding their advertising tag into advertisement markup of Buyers ad campaign, in financial exchanges such systems may be connected using exchange APIs and observe buy and sell trading bid streams. All Trading Systems and Electronic Measurement Systems have their own Data Processing/Encryption Nodes, which form Channel Layer of the architecture and are connected to Storage Nodes of Data Blocks Persistence Network, where data is stored in encrypted form enforcing permissioned read access. Data Processing/Encryption Nodes encrypt events data, generate Data Blocks and store them in Storage Nodes. Data Processing/Encryption Nodes also read Data Blocks of others to run data clearing verifications. Data Processing/Encryption Nodes interact with Blockchain Network nodes to register Data Blocks, register data clearing results, and verify authenticity, immutability and trusted timestamp of Data Blocks and data clearing results reported by others. Blockchain Database is maintained by Blockchain Network nodes and contain Decentralized IDs of all participants, clearing smart contracts, Data Block hash codes and timestamps, Data clearing results and Digital Currency Transactions, organized as described above. Based on Data Blocks Persistence Network and Blockchain Database data Buyer, Seller and other participants can run applications, which provide them interfaces for data audit, data discrepancy detection, dispute resolutions, payments clearing and automatic settlement. Using these applications, they can detect hidden fees of electronic trading systems and their manipulations with event reporting or orders processing, generating proofs of bad activities, which can be used in enforcement processes.

FIG. 8 illustrates example architecture for particular case of audit and payment clearing for programmatic advertising systems. Publisher is an operator of website or mobile application. Publisher sells ad inventory by using integration code, provided by Supply Side Platform (SSP). SSP is ad trading system, which runs bidding auctions for every potential ad impression at Publisher's website or mobile application, by sending bid requests to other trading systems and receiving bid responses from them. Ad Exchange represents ad trading system which works as an intermediary between SSP and Demand Side Platform (DSP), proxying bid requests and responses between these two systems. DSP serves to Advertiser, which buys ad inventory, by making bid responses according to the strategy chosen by Advertiser, for example, making bids for potential impressions only if visitor, which browse Publisher website or mobile application, represents specific social demographic group and is located in specific geographic position. As Buyer and Seller don't trust to SSP, Ad Exchange and DSP, they require usage of Antifraud Measurement Vendors, which make own observations of ad impressions delivery on Publisher website or mobile application for visitor, checking if visitor actually viewed the ad, if context of the web page or application around the ad follows Advertiser brand safety policy, if visitor is not an artificially created crawling software (bot) and making other verifications. Antifraud Measurement Vendors are integrated by inclusion of their measurement tag into ad campaign markup served by DSP, Ad Exchange or SSP. All systems report their log level data on ad impressions to their own Data Processing/Encryption Nodes, which form Channel Layer of the architecture and are connected to Storage Nodes of Data Blocks Persistence Network, where impression data is stored in encrypted form enforcing permissioned read access. Data Processing/Encryption Nodes encrypt ad events data, generate Data Blocks and store them in Storage Nodes. Data Processing/Encryption Nodes also read Data Blocks of others to run data clearing verifications. Clearing for payments between SSP and Ad Exchange may be based, for example, on impression bids reported by SSP, Ad Exchange and confirmations of impression delivery by Antifraud Measurement Vendor 1. If all systems agree joint payments clearing, then all systems may become participants of single CCSC and payments to all systems will be done directly from Advertiser, removing overhead of doing chained payments within supply chain and having associated risks of not being paid in time. Data Processing/Encryption Nodes interact with Blockchain Network nodes to register Data Blocks, register data clearing results, and verify authenticity, immutability and trusted timestamp of Data Blocks and data clearing results reported by others. Blockchain Database is maintained by Blockchain Network nodes and contain Decentralized IDs of all participants, clearing smart contracts, Data Block hash codes and timestamps, Data clearing results and Digital Currency Transactions, organized as described above. Based on Data Blocks Persistence Network and Blockchain Database data Advertiser, Publisher and other participants can run applications, which provide them interfaces for advertising data audit, ad impressions and payments discrepancy detection, dispute resolutions, payments clearing and automatic settlement. Using these applications, they can detect hidden fees of SSPs, Ad Exchanges and DSPs and their manipulations with event reporting or impressions processing, generating proofs of bad activities, which can be used in enforcement processes.

FIG. 9 illustrates exemplary interactions for verification of electronic trading system fees and payment transaction amount by CCSC participants. In the example, Buyer and Seller of some asset are connected via three different trading systems, which act as intermediaries. All three systems have established CCSC with read access to events data for all systems, Buyer and Seller. Seller puts asset Sell Order using Electronic Trading System 1, which adds own service fee (brokerage commission) to sell order amount and sends order with new amount to Electronic Trading System 2. System 2 also adds own service fee and sends sell order to Electronic Trading System 3. System 3 adds own service fee and displays available sell orders to connected Buyer via trading interface. Buyer puts Buy Order for the asset into Electronic Trading System 3, which sends it to connected Electronic Trading System 2 with service fee subtracted from Buy Order amount. System 2 also subtracts own service fee and sends Buy Order to System 1. In the example, Electronic Trading System 1 is making Orders match (orders matching in financial exchange or bidding auction for impression being sold by Publisher in programmatic advertising) and run asset exchange (ad impression delivery in programmatic advertising) transaction for matched Orders. According to CCSC, System 1 writes resulting transaction as audit event into Data Block, which time period includes transaction timestamp. After transaction is made, System 1 notifies Seller on the transaction, subtracting own service fee from transaction amount. System 1 also notifies System 2, which in its turn notifies System 3, and System 3 notifies Buyer. When current timeframe is completed, as described above for FIG. 2 and FIG. 4, System 2 submits Data Block with transaction event that includes transaction amount, into Data Blocks Persistence Network and Blockchain Database. By querying Blockchain Database and Data Block Persistence Network, every participant can verify that System 1 actually submitted valid transaction report into Data Block, registered for established CCSC, including verification of Data Block authenticity, immutability and whether Data Block was registered after transaction timestamp within allowed time period. Seller can derive System 1 fee amount from registered transaction event and check if it matches with their legal contract. Same way System 3 can derive System 2 fee amount from transaction event and check if it matches with their legal contract. Finally, Buyer can derive sum of System 2 and System 3 fee amounts from transaction event. If System 2 or System 3 also write their transaction amount data into own CCSC Data Blocks, then Buyer is able to derive separate System 2 fee amount and System 3 fee amount from these reports and check if they match with legal contracts. In case if verification fails (for example, no transaction data found, corrupted Data Block, invalid timestamp, service fee don't match contractual obligations), participant file relevant claim to blockchain, database making it available to other participants, auditors and enforcement bodies, which can verify correctness of the claim and go ahead with legal enforcement. If trading system tries to provide asymmetric data to buying and selling side, presenting to them different transaction amounts or different service fees, it becomes visible to at least one of them, as Data Block is immutable and contains single transaction amount, visible to all parties.

FIG. 10 illustrates exemplary interactions for enforcement of transaction payment from buying trading system, which tried to censor transaction report to avoid payment for delivered transaction. It is an exemplary application of method to detect event report censorship. In the example, Buyer and Seller of some asset are connected via Electronic Trading System 1 and Electronic Trading System 2. To make $3^{rd}$ party verification of transaction delivery, independent Electronic Measurement System is included as participant of CCSC. All three systems have established CCSC with read access to events data for all systems, Buyer and Seller. Existence of connected independent Measurement Systems is a key to prevent transaction report censorship, as they help to reach consensus on transaction delivery between CCSC participants even in case if one of them don't report transaction. To achieve that, clearing criteria used in CCSC shall consider transactions as eligible (billable) when they are reported by selling side and by one or more independent Measurement Systems, even if they aren't confirmed by buying system. Having more independent measurement systems ensures higher protection against collusion between them and buying side participants. On the diagram, Seller puts Sell Order, System 1 sends Sell Order to System 2 with added own service fee, System 2 displays Sell Order to Buyer with added own service fee. Buyer puts Buy Order into System 2, System 2 subtract service fee and sends Buy Order to System 1, which match Buy and Sell Order and initiate appropriate transaction of asset exchange (ad impression delivery in programmatic advertising). System 1 sends notification on the transaction to Electronic Measurement System and Electronic Trading System 2. All three systems, Electronic Trading System 1, Electronic Measurement System and Electronic Trading System 2, check transaction delivery by using appropriate mechanisms depending on transaction nature (checking custodian services and banks for financial assets, checking ad impression delivery and its viewability and antifraud metrics by embedding own measurement code on the web page or into mobile application software). If system consider transaction as delivered, it writes audit event with transaction confirmation into CCSC Data Block. In the example, Electronic Trading System 1 and Electronic Measurement system writes transaction confirmation, while buying side Electronic Trading System 2 don't do that trying to avoid payment for the transaction, at the same time requesting payment from Buyer to increase own profits. As a result, Electronic Trading System 1 and Electronic Measurement System submit CCSC Data Blocks for relevant timeframe with transaction confirmation included, while Electronic Trading System 2 submits CCSC Data Block for the same timeframe without transaction confirmation included. The example assumes that CCSC clearing criteria requires joint confirmation from System 1 and Measurement System to consider transaction as billable. During clearing consensus, which runs as described for FIG. 4, all systems, including Electronic Trading System 2, have to agree on the clearing result, which enforces payment for the transaction by System 2. If System 2 tries to compromise consensus protocol by reporting wrong clearing result, which don't match clearing criteria, System 1 or Measurement System appeals to pre-agreed in CCSC independent Auditor or consortium of Auditors to resolve consensus dispute. Auditor verifies clearing results as described for FIG. 4 and resolves it in favor of System 1 with obligation for System 2 to pay for the transaction.

FIG. 11 illustrates exemplary interactions for prevention of extra payment to selling trading system, which tried to create fake transaction reports to increase own profits. It is an exemplary application of method to detect fake event reporting. In the example, Buyer and Seller of some asset are connected via Electronic Trading System 1 and Electronic Trading System 2. To make $3^{rd}$ party verification of transaction delivery, independent Electronic Measurement System is included as participant of CCSC. All three systems have established CCSC with read access to events data for all systems, Buyer and Seller. Existence of connected independent Measurement Systems is a key to prevent fake transaction reporting, as they help to reach consensus on transaction delivery between CCSC participants even in case if one of them tries to forge fake transactions. To achieve that, clearing criteria used in CCSC shall consider transactions as eligible (billable) only when they are reported by both selling side and by one or more independent Measurement Systems. Having more independent measurement systems ensures higher protection against collusion between them and selling side participants. On the diagram, Electronic Trading System 1 puts fake Sell Order on behalf of Seller, which in reality is not participating in the transaction, and sends this order to System 2, System 2 displays Sell Order to Buyer with added own service fee. Buyer puts Buy Order into System 2, System 2 subtract service fee and sends Buy Order to System 1, which match Buy and fake Sell Order and initiate appropriate transaction of asset exchange (ad impression delivery in programmatic advertising). System 1 sends notification on the transaction to Electronic Measurement System and Electronic Trading System 2. All three systems, Electronic Trading System 1, Electronic Measurement System and Electronic Trading System 2, check transaction delivery by using appropriate mechanisms depending on transaction nature (checking custodian services and banks for financial assets, checking ad impression delivery and its viewability and antifraud metrics by embedding own measurement code on the web page or into mobile application software). If system consider transaction as delivered, it writes audit event with transaction confirmation into CCSC Data Block. In the example, Electronic Trading System 1 writes transaction confirmation, while Measurement System and Electronic Trading System 2 don't do that as transaction remain undelivered. As a result, Electronic Trading System 1 submit CCSC Data Blocks for relevant timeframe with transaction confirmation included, while Measurement System and Electronic Trading System 2 submits CCSC Data Block for the same timeframe without transaction confirmation included. The example assumes that CCSC clearing criteria requires joint confirmation from System 1 and Measurement System to consider transaction as billable. During clearing consensus, which runs as described for FIG. 4, all systems, including Electronic Trading System 1, have to agree on the clearing result, which enforces payment for the transaction by System 2. If System 1 tries to compromise consensus protocol by reporting wrong clearing result, which don't match clearing criteria, System 2 or Measurement System appeals to pre-agreed in CCSC independent Auditor or consortium of Auditors to resolve consensus dispute. Auditor verifies clearing results as described for FIG. 4 and resolves it in favor of System 2 with rejection to pay for the fake transaction. According to described examples, protection against transaction censorship and fake transactions can be achieved by declaring clearing criteria, which makes transactions eligible for payment if and only if they are confirmed by selling side system and one or multiple independent measurement systems. Level of protection depends on the ability of measurement system operators to collude with selling or buying side systems and risk own reputation trying to get extra profits. Such collusions may be detected by selective verification of transaction delivery by additional measurement systems, which are temporarily included into clearing process. Risks of collusion exposure and consequent legal enforcements and significant damages to the business, makes this kind of bad activities uninteresting for measurement system operators.

FIG. 12 illustrates exemplary interactions for a method of continuous audit of trading systems, detection and exposure of bad actors and low performance suppliers. In the example, specific Authority body or Authorities Consortium, for example industrial consortium in digital advertising, consisted of industry associations, functioning with the aim of industry self-governance, or national financial authority bodies, approve accreditation for Auditors, by approving accreditation claim in their Decentralized ID stored in Blockchain Database. Plurality of Sellers, Electronic Trading Systems, Electronic Measurement Systems and Buyers use CCSCs for their transaction payments clearing by using Blockchain Database and Data Blocks Persistence Network as described above for FIG. 4, forming ecosystem of relationships. CCSC events read access policy enables access for end-Buyers, end-Sellers and accredited Auditors, agreed by CCSC participants. Electronic Trading Systems and Electronic Measurement Systems write authenticated transaction event data into CCSC Data Blocks and continuously analyze available Data Blocks data to detect bad activities and low performance services. For example, buying systems monitor that total fees of intermediary trading systems are within specific threshold, and that transactions delivery is confirmed as non-fraudulent by credible measurement systems. Availability of detailed transactional data from all participants makes possible creation of artificial intelligence systems, which detect suspicious patterns and help to optimize buying processes. $3^{rd}$ party software vendors can provide such services as applications on top of Blockchain Database and Data Blocks Persistence Network to ecosystem participants, including automated data analysis and visualization dashboards. All participants have ability to file public or anonymous (by encrypting them on Auditor encryption public keys) claims on other CCSCs participants to accredited Auditors by doing appropriate transactions in Blockchain Database, where they provide reference on CCSCs and Data Blocks as secure proof of protocol violations, fraud attempts and low performance services. Provided that Auditors have read access to proof data, they verify proofs by reading and verifying validity of relevant clearing events data, as described for FIG. 2, FIG. 3, FIG. 4, FIG. 10 and FIG. 11 above. Auditors determine accountable parties by their Decentralized IDs and add bad actors and low performance vendors to shared knowledgebase maintained in Blockchain Database. Storing this knowledgebase in Blockchain Database ensures that only accredited Auditors can update it and that full history of their operations is always available to everyone. Neither party can make knowledgebase unavailable or corrupt and all ecosystem participants can verify authenticity of its entries. Authority body or Authorities Consortium can additionally confirm knowledgebase entries in Blockchain Database and provide them enforcement status, for example, banning bad actors by their Decentralized ID from ability of working in the ecosystem, so that neither party will be able to use CCSCs with them. Enforcement measures like blacklisting of bad actors create pressure on all ecosystem participants to work honestly according to established protocols and agreements. Ecosystem participants continuously monitor shared knowledgebase to get authentic data on bad actors, low performance vendors and enforcement measures against them, and use this information for better decision making and business optimizations. Auditors and Authorities also use shared knowledgebase on their end as valuable information source to improve protocol standards, antifraud measures, create best practice guidelines and educate ecosystem participants. Described workflow leads to self-governed cleanup of market ecosystem from bad practices.

Additional Description of Disclosed Methods and Systems

Method and system for transparency, audit and payment clearing of electronic trading systems using blockchain database is provided. Method includes connection of trading platforms and measurement systems to data processing and storage layer, which uses blockchain database to ensure identification of reporters, authentication, immutability and trusted timestamping of reported data. A novel aspect of a method lies in joint usage of blockchain network and storage network to overcome blockchain data throughput limitation, which usually is limited to thousands of transactions per second, and enable processing of events reported by high load trading systems with volumes above one million events per second, providing the same immutability and trusted timestamping guarantees for these events. Field of invention also includes secure consensus protocol for collected data clearing (reconciliation) by plurality of data reporters to agree on a clearing result, which is based on application of pre-agreed clearing criteria immutably stored in blockchain database as a smart contract, permissioned data access and independent processing of reported data. Decentralized clearing process ensures unified data clearing result for all communicating platforms. A novel feature also includes methods for detection and prevention of fake data reporting, data censorship and payment data discrepancies. Continuous audit process is proposed to use collected data to determine bad actors and low performance suppliers and expose them in shared knowledgebase stored in blockchain database to ensure their accountability.

A method for batched transaction processing in blockchain network to increase network throughput and ensure permissioned read access for transactional data. To address scalability issue of existing blockchain networks, where transactional throughput is limited at thousands of transactions per second, middleware on top of blockchain network is used, which allows network customers to group their transactions into batches and run blockchain consensus protocol for batches instead of separate transactions. This approach also enables encryption of transactional data in a way, that transaction originators can define for each transaction, who will have permission to read transactional data.

To start batched processing, blockchain network customers shall enter into an agreement for batch processing of transactions between them, specifying protocol and rules for batch processing between them in a smart contract, written into blockchain database. For example, rules may include transaction verification criteria, transaction batch formation rules, transaction data access control policy, batch consensus protocol and dispute resolution protocol. Each transaction (for example, audit event data report or financial transaction in digital currency), which originator wants to write into blockchain database to ensure its authentication, immutability, trusted timestamping, availability to other parties, and compliance with native blockchain verifications, such as prevention of double spending, and for which there exists smart contract for batch processing agreed and authenticated between all transaction participants, may be processed using batch logic. A protocol for batch processing includes: a) each transaction batch consists of several batch parts, where each batch part represents a group of transactions, e.g., originated by a specific participant; b) each participant collects multiple transactions with other participants into a batch part, before submitting them to blockchain network; c) all participants apply agreed upon batch formation rules to verify that a transaction should belong to specific batch, and to verify batch completeness, for example, a batch is considered complete, if the batch was formed for transactions that occurred during a specific hour of the day and 6 hours have passed since the specific hour (e.g., this represents a technology tradeoff between transaction latency and transaction throughput; by choosing longer batch completeness criteria, participants sacrifice transaction execution latency in favor of network throughput); d) participants make batch ordering (batches are processed and submitted to the network sequentially, to establish batch sequence participants use blockchain database for trusted timestamping of their batch part cryptographic hashes) and transaction ordering within the batch, if required (transactions from all batch parts are ordered into a single sequence during batch processing to compute resulting blockchain transactions for the batch; for example, participants may include a reference to previous transaction cryptographic hash into the next signed transaction and exchange this information using peer-to-peer communication protocol, it will allow them to track a sequence of transactions while processing the batch, including ordering of transactions created by different originators, which fall into different batch parts); e) all participants have robust transport protocol to exchange on the content of transaction batch parts between each other, for example, they may use a storage network such as IPFS (InterPlanetary File System) and write batch part data for completed batches with availability for other participants; d) to ensure permissioned read access for transactional data, participants may encrypt every transaction in the batch part using cryptographic keys, so that only designated parties with access to these keys will be able to decrypt and read transactional data; e) when all batch parts are completed and written to the storage, participants locate (for example, by using peer-to-peer discovery protocol or blockchain database as source of information to locate batch part data within the storage network) and read each other's batch parts using a transport protocol, decrypt transactional data using their own keys and process all transactions from the batch locally, generating resulting aggregated blockchain transactions for the batch (for example, batch may include millions of digital currency transactions between participants A, B and C, but as result of their processing there will be a maximum of three resulting transactions: A to B (A<→B), B to C (B<→C), and A to C (A<→C)); f) resulting transactions are authenticated and written into the blockchain database (publicly or in encrypted form depending on agreed data access policy) by each batch participant independently from others; g) if written resulting transactions match each other, meaning that all parties are in agreement over batch result, then any participant can use smart contract to force actual execution of resulting transactions in the blockchain network, finalizing batch processing; h) privacy preserving blockchain networks and protocols can be used to ensure that executed resulting transactions will be in compliance with data access policy; i) if participants have conflicting resulting transactions, then dispute resolution rules are applied, for example, involving independent third party actors (for example, blockchain validator nodes or auditors) and providing them access keys to read batch parts using transport protocol, decrypt batch transactional data, independently calculate resulting aggregated blockchain transactions and decide on batch result by voting process. Key features include: a) grouping of multiple transactions between the same participants into batches and processing of these batches instead of separate transactions; b) calculating of resulting blockchain transactions for the batch is performed by participants themselves without involvement of blockchain validator nodes to significantly reduce load on blockchain network; c) transaction ordering constraints are enforced; d) if participants have mismatched resulting blockchain transactions for the batch, additional participants such as blockchain validator nodes, are included into the process to run dispute resolution and decide on the batch result, for example, via voting process; e) transactional data is encrypted and keys are distributed according to agreed data access policy.

Some example techniques are described herein in the context of an application for audit and payment clearing of electronic trading systems.

Additional Examples of Disclosed Methods and Systems

1. A method (method 1) for authentication, immutability and trusted timestamping of large audit event logs reported by electronic platforms. This method comprising: audit log events aggregation into timeframe aligned Data Blocks (for example, separate Data Block is generated for every hour during the day, resulting in 24 Data Blocks per data source per day), reporting of Data Block hashes into blockchain database by Data Block reporter for authentication, immutability and trusted timestamping. A novel aspect of this method lies in achieving authentication, immutability and trusted timestamping guarantees for audit log events with low computational and networking overhead due to utilization of blockchain database consensus protocol only for batched event data blocks rather than for separate events. Multiple events during specific period of time are grouped into separate Data Block and cryptographic hash of the whole block is reported to blockchain database to ensure its authentication, immutability and trusted timestamping. The method enables usage for high throughput electronic systems with millions of audit events per second, where a slow blockchain database performance, which usually does not exceed thousands of transactions per second, what becomes a technological blocker. Any party with access to blockchain network and specific block data can verify: who reported the Data Block (block report transaction signature verification in blockchain), when Data Block was created and reported (not later than timestamp of transaction inclusion block in blockchain database) and whether available Data Block content is not corrupt (calculated Data Block cryptographic hash is identical to the hash stored in blockchain database).

2. A method (method 2) for storage of large audit event logs reported by electronic platforms with enforced availability, authentication, immutability, trusted timestamping, and permissioned read access. This method comprising: usage of Method 1, usage of peer-to-peer storage network (for example, IPFS (Interplanetary File System) (https://ipfs.io/)) to ensure that reported data is available to all interested parties and their systems and they can make own data copies of Data Blocks to keep them available, even in the event of deletion of original Data Block image by reporter; since reported events data is usually private and read access should be distributed according to legal agreements to designated group of participants, content in Data Blocks has specific structure with Data Block parts, called Streams, encrypted using symmetric cryptography; for each event reported to the Data Block, reporter defines list of identified participants, using their public keys or Decentralized IDs (https://w3c-ccg.github.io/did-spec/) for identification, which should be able to read this event data; in the Data Block event is stored into the Stream, which corresponds to unique set of participants with read access (e.g., two events go into the same Stream if and only if they have exactly the same set of participants, which should be able to read them; for example, data for ad impression A and ad impression B should be available for publisher P, advertiser A, auditor X and nobody else, so they both are written into the same Stream); for each Stream in the Data Block, reporter securely generates AES encryption key and encrypts event data in the Stream using AES algorithm; reporter puts generated AES key for each Stream in encrypted form to the Data Block header, using asymmetric encryption algorithm and encryption public keys of respective participants to ensure that AES keys are available only to participants with read access for respective Streams; to read Stream data participants use their encryption private keys to decrypt AES keys and then decrypt Stream data using AES key; according to this protocol and as Data Blocks are created for sequential timeframes, read access for specific participant cannot be revoked by reporter for already created Data Blocks, but it can be revoked for new Data Blocks; provided scheme for permissioned Data Block read access enable replication of Data Blocks in IPFS storage network to external storage nodes, owned by $3^{rd}$ parties, without risk of data confidentiality breach. A novel aspect of this method lies in usage of peer-to-peer storage network and cryptographic algorithms for simultaneous enforcement of availability and read access protection for reported data, where data reporter can set the policy who can read the data at the moment of data reporting, but cannot revoke that policy or cause data unavailability/censorship after reporting. This approach ensures that data reporter cannot repudiate from audit event reports after they are made, as any party with read access will be able to get original report data and verify its authenticity.

3. A method (method 3) of scalable audit event data collection for electronic trading systems and measurement systems to ensure event data availability, authentication, immutability, trusted timestamping, identification of participants and permissioned read access. The method comprising: registration of Decentralized IDs of electronic trading systems and measurement systems in blockchain database, management of cryptographic keys for trading systems and measurement systems, verification of Decentralized IDs ownership by designated authorities; usage of Method 1 and Method 2 to collect and store data.

4. A method (method 4) for secure data clearing between electronic trading systems according to pre-agreed clearing criteria: establishment of clearing channels between two or more participants with pre-agreed clearing criteria using blockchain database, where all participants sign criteria agreement and store it in blockchain database as Clearing Channel Smart Contract (CCSC); collection of data by all participants using Method 3, where Data Blocks are linked to CCSC and each CCSC participant has read access to Data Blocks of other participants; usage of aligned time periods (timeframes; for example, every hour during the day may represent separate timeframe) for Data Blocks of all participants and overlap time period for neighbor Data Blocks (for example, 5 minutes before and after each hour during the day are written into both sequential data blocks, one of which represents the previous hour, and another represents the next hour) to ensure resistance to event timestamp deviations, which might cause improper events data matching between Data Blocks; clearing process starts for every timeframe when respective Data Blocks for this timeframe are reported by all CCSC participants and their hashes are stored in blockchain database; during clearing process CCSC participants achieve consensus on Data Blocks clearing result for specific timeframe by independently reading, aggregating and verifying Data Blocks of all participants against clearing criteria, including verification of Data Block authenticity, immutability and trusted timestamp; all participants save aggregation and verification outcome into blockchain database in encrypted form with their transaction signature; encryption enables access to clearing outcomes stored in blockchain database only for CCSC participants; after all participants report their results, they check, if reported clearing results match each other and in that case consider clearing as successfully resolved; otherwise clearing for the timeframe is considered disputed and participants have to agree clearing result by doing dispute resolution; dispute resolution policy is pre-agreed in CCSC and might include clearing result decision making by external $3^{rd}$ party auditors and authorities, or their consortium voting, or by manual agreement between CCSC participants over clearing result; being interested in clearing finalization, participants also natively incentivized to store local copies of all Data Blocks for specific timeframe until clearing process for the timeframe is finished. This method ensures that all parties of CCSC are identified, have access to event data of others to make verification statements and after agreeing CCSC neither party can: (a) change agreed clearing criteria; (b) tamper with event data of others to influence clearing outcome; (c) tamper with own event data after it was reported to influence clearing outcome; (d) make event data unavailable after it is reported to influence clearing outcome; (e) repudiate from previously reported own event data; (f) report wrong clearing result to influence clearing outcome without falsification being detected (wrong result reporting can be verified by any party with CCSC Data Blocks read access).

Inclusion of independent Measurement Systems as CCSC participants between Selling and Buying systems allow them to reach agreement over payment clearing results as these $3^{rd}$ parties act as independent arbiters providing own event observations as additional clearing data source. If there is risk of collusion between some of CCSC participants, parties should look for inclusion of more independent participants into CCSC to ensure higher level of clearing consensus security.

A novel aspect of this method lies in providing a secure protocol for enforcement of clearing agreement between a plurality of electronic systems based on large event arrays reported by these systems, with throughput above one million of events per second. All reported event data and reported clearing results remain available, authenticated, immutable and timestamped, so that neither system can compromise protocol without being detected by other systems. To achieve that a method relies on previously described novel methods.

5. Method 4, wherein electronic trading system comprises programmatic advertising platforms (DSPs, SSPs, Ad Exchanges, Trading Desks).

6. Method 4, wherein electronic trading system comprises financial exchange/trading platforms.

7. A method (method 7) for automatic payment transactions settlement based on payment data clearing between electronic trading systems: usage of Method 4 for payment data clearing with blockchain database that supports digital currency (cryptocurrency) transactions between CCSC participants (including blockchain double spending protection and consensus protocol, which is considered secure to perform digital currency payments by CCSC participants); as soon as clearing for specific timeframe is finalized by CCSC participants and as a result all participants agree on payment transactions and their amounts in blockchain database, any participant has right to execute automatic transactions settlement for the timeframe by calling CCSC settlement function; CCSC settlement function transfers digital currency between CCSC participants (from buyers to sellers and suppliers) as a means of payments fulfilling their contractual obligations; execution of settlement transactions and their correctness is verified by nodes of blockchain network—according to established blockchain consensus protocol nodes reach consensus on the fact that transactions are agreed between all clearing channel participants by reading blockchain database, and that they don't violate blockchain protocol rules such as double spending protection; successful transactions are added to blockchain database by blockchain network nodes.

8. A method (method 8) to detect payment discrepancies, such as hidden fees, and platforms accountable for that, within the chain of trading platforms used as intermediaries between the buyer and the seller: usage of Method 4 for payment data clearing between all trading platforms working as intermediaries between buyer and seller, where data blocks read permission granted to all platforms, the buyer and the seller; by reading shared clearing results from blockchain database and comparing them with invoiced transaction amounts, the buyer, the seller, intermediary platforms and external auditors can detect differences in invoiced payment amounts and stored in blockchain database as clearing results; participants can determine which platforms are accountable for wrong reporting and save public claims in blockchain database to expose bad actors behavior. An aspect of novelty of this method is in ability to detect fraudulent activities of intermediary trading systems in complex buying chains between the buyer and the seller, aimed to hiddenly increase their revenues at the cost of buyer and seller by charging hidden fees or receiving hidden rebates from other intermediaries. To achieve that a method relies on establishment of CCSC between intermediary trading platforms, providing read access to clearing data to buyers and sellers simultaneously, usage of previously described method for clearing consensus and verification of clearing results by participants.

9. A method (method 9) to detect event reporting censorship by buying trading system to influence payment clearing result towards lower amount: usage of Method 4 for payment data clearing between trading platforms, where multiple measurement systems are also connected as clearing channel participants, which detect audit events independently from participating trading platforms; having higher amount of measurement systems being connected to measure audit events ensures higher protection against their collusion with buying trading system for joint censorship; clearing criteria should be established so that audit events will be accounted as billable, only if confirmed by at least one measurement system; in that case if there is at least one non-colluding measurement system in the clearing channel, censorship become ineffective. An aspect of novelty of this method is in ability to detect fraudulent activities of intermediary trading systems in complex buying chains between the buyer and the seller, aimed to increase their revenues at the cost of buyer and seller by censoring event reports. To achieve that a method relies on establishment of CCSC between intermediary trading platforms with clearing criteria, which demand existence of verified event reports from independent measurement systems to make these events billable, as well as usage of previously described method for clearing consensus and verification of clearing results by participants.

10. A method (method 10) to detect false event reporting by selling trading system to influence payment clearing result towards higher amount: usage of Method 4 for payment data clearing between trading platforms, where multiple measurement systems are also connected as clearing channel participants, which detect audit events independently from participating trading platforms; having higher amount of measurement systems being connected to measure audit events ensures higher protection against their collusion with selling trading system for joint false event reporting; clearing criteria should be established so that all audit events, which are not confirmed by at least one measurement system will not be accounted as billable; in that case if there is at least one non-colluding measurement system in the clearing channel, false event generation becomes ineffective. An aspect of novelty of this method is in ability to detect fraudulent activities of intermediary trading systems in complex buying chains between the buyer and the seller, aimed to increase their revenues at the cost of buyer and seller by creating fake event reports. To achieve that a method relies on establishment of CCSC between intermediary trading platforms with clearing criteria, which demand existence of verified event reports from independent measurement systems to make these events billable, as well as usage of previously described method for clearing consensus and verification of clearing results by participants.

11. A method (method 11) for continuous audit of trading systems, detection and exposure of bad actors and low performance suppliers: provided that trading systems use Method 4 for their payments data clearing, any participant or authority which has read access to clearing data blocks can run automatic audit process for any specific constraints violation or use machine learning models on reported data for bad activity detection (for example, percentage of advertising impressions reported by measurement systems as fraudulent/invalid for trading platform exceed 5%; discrepancy in events count between trading platform and specific measurement system is higher than 7%; complex machine learning/artificial intelligence models); if constraints are violated or machine learning model trigger positive signal, participant or authority may decide to publish this information into blockchain database so that other participants may refer to it when making decisions; to ensure that violation is published correctly, the publication can be confirmed in blockchain database by several parties which have read access to data blocks under consideration to verify publication statement, for example, by buying party and some independent 3rd party auditor or authority; market participants can read precedents information from blockchain database, consider it as credible if it is signed by credible parties and avoid deals with bad actors and low performance suppliers; specific authorities, which have read access to clearing channels established between market participants, can maintain publicly available database of precedents and bad actors in blockchain database, which will help market participants to choose better suppliers and will lead to market cleanup from bad actors.

12. The above-described methods may be embodied in systems and/or computer readable instructions that are stored on a non-transitory computer readable medium, which when executed by at least one processor implement techniques as described above.

Additional Description

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity. Below few examples are provided.

Blockchain database, sometimes called distributed ledger, is a distributed database, maintained by two or more computer nodes organized into computer network using protocols, which ensure that all nodes are authenticated, follow same set of protocol and application rules, all database state changes are validated against defined set of rules by all or specified subset of nodes, validated database state changes are applied and state change data is stored by all or specified subset of nodes and can't be changed without special agreement between these nodes. Blockchain database may be implemented using different software, hardware and protocols. By blockchain database we refer to any distributed ledger implementation and physical network, including software implementations such as Ethereum, HyperLedger Fabric or Corda, which allows basic blockchain database features: authentication of network participants, synchronised validation of new database transactions by all or subset of network participants, synchronised storage of transaction information by all or subset of network participants, immutability of stored transaction records. Synchronised process here means that the process is performed identically by several network participants and they run specialized protocol to verify this fact and resolve possible discrepancies, ensuring that participants have the same process results.

Audit Data Block Persistence Network, referenced in several diagrams, can be implemented not only as peer-to-peer network where data objects are discovered using their cryptographic hashes (example is IPFS software implementation), but as any kind of storage network, potentially combining different storage solutions such as Amazon S3 and Google Cloud Storage Buckets, which provides functionality of: (a) writing storage objects consisting of arbitrary data of various size into storage nodes disk space by authorized entities and getting object URL (Uniform Resource Locator, https://tools.ietf.org/html/rfc3986) or some form of Object ID; (b) discovering location of storage object using its URL (Uniform Resource Locator, https://tools.ietf.org/html.rfc3986) or Object ID, (c) reading storage object data based on its location.

Decentralised ID, referenced in descriptions, can be implemented as public key certificate (https://en.wikipedia.org/wiki/X.509, https://tools.ietf.org/html/rfc5280, https://www.itu.int/rec/T-REC-X.509) as well as data encryption keys can be managed using public key infrastructure and public key certificates.

Additionally Methods and Systems for Implementing Blockchain Database Transactions As generalisation of a method for authentication, immutability and trusted timestamping of large audit event logs reported by electronic platforms, following methods are proposed for processing of arbitrary transaction series between subsets of blockchain database users.

Definitions

Blockchain database or distributed ledger—distributed database, maintained by two or more computer nodes organized into computer network using protocols, where network nodes are authenticated and use consensus mechanism to validate database state changes against agreed set of rules and store database state and state change history in sync between each other. No data change can happen without validation through consensus mechanism.

Data immutability—the property of the data stored in distributed ledger, when database rules restrict any changes for the data and such restriction is enforced through consensus mechanism.

Database state—data stored in the database at a given moment.

Blockchain (distributed ledger) transaction—proposal for database state change authorized by one or more database users, which may include constraints and dependencies to be validated as part of consensus mechanism for current database state.

Transaction originator—database user, which submits transaction to the network for its processing.

Transaction signatories—one or more database users, which are required to authorize the transaction for its approval (e.g. by signing transaction with cryptographic signatures).

Transaction validation—part of transaction execution process—verification of transaction authorization by its signatories, as well as protocol rules, constraints and dependencies defined in the transaction or in the existing database state by subset of blockchain nodes participating in consensus mechanism. Validation always results in either approval or rejection of the transaction.

Transaction ordering—part of transaction execution process—calculation of transaction order in the sequence of network transactions by subset of blockchain nodes participating in consensus mechanism, resulting in unique reference to preceding state change for transaction, if required.

Transaction execution—transaction validation followed by ordering and applying of transaction state change upon transaction approval.

Background:

Blockchain transaction validation is a costly process, as it requires network communication, database storage and computations to be performed by multiple computer nodes. As consequence, blockchain database transaction throughput is usually limited at specific maximum quantity of transactions per second database is able to process. It affects practical applicability of blockchain database for various use cases, which require high transaction throughput, such as programmatic advertising.

A method of processing for finite transaction series between subset of blockchain database users, comprising:
  Supporting special blockchain transaction, which requires authorization of all users in the specific subset of blockchain database users and confirms their intention to use described method for processing of specific finite transaction series between them and defines set of one or more validating users within the subset, which will be required to authorize transaction series result in the database;
  Providing every validating user with local transaction series simulation process, which allow user without necessity to communicate over the network with other users or blockchain database nodes to simulate transaction series execution using transaction series and its dependencies data and calculate single combined transaction for the blockchain database, which needs to be authorized by all validating users and upon execution in the database will result in the same database state change as if said transaction series is executed in the database as normal;
  Providing local memory for every validating user that is capable to store said transaction series and its dependencies data for transaction series simulation;
  Providing network communication between users and blockchain nodes, that allow any validating user in the said subset to receive said transaction series and its dependencies data for transaction series simulation;
  Executing said special blockchain transaction by one of the users in the said subset, so that every user in the subset authorizes the transaction and it is successfully added to the blockchain database;
  Adopting policy to reject attempts of individual execution of transactions in said series after said special blockchain transaction is executed;
  Receiving transaction and dependencies data for said transaction series and storing them in said local memory by every validating user in the subset;
  Simulating of said transaction series getting the data from said local memory by every validating user within the subset, calculating combined transaction;
  Submitting combined transaction to the database by one of the validating users in the subset;
  Authorizing submitted combined transaction by all validating users in the said subset based on the fact that database state change associated with said combined transaction matches database state change that they calculated in a result of own independent transaction series simulation on the previous step;
  Finalizing submitted combined transaction execution in the database according to normal transaction execution process, resulting in the same database state change as if said transaction series was executed as normal.

A method of processing for perpetual transaction series between subset of blockchain database users, comprising:
  Supporting special blockchain transaction, which requires authorization of all users in the specific subset of blockchain database users and confirms their intention to use described method for processing of specific transaction series between them and defines set of one or more validating users within the subset, which will be required to authorize transaction subseries results in the database;
  Providing every user in the subset with transaction series split rule, which splits transaction series into a sequence of disjoint finite transaction subseries and allow user to determine for each transaction in said series to which subseries it belongs;
  Providing every validating user with local transaction subseries simulation process, which allow user without necessity to communicate over the network with other users or blockchain database nodes to simulate transaction subseries execution using transaction subseries and its dependencies data and calculate single combined transaction for the blockchain database, which needs to be authorized by all validating users in the said subset and upon execution in the database will result in the same database state change as if said transaction subseries is executed in the database as normal;
  Providing local memory for every validating user that is capable to store any transaction subseries and its dependencies data for transaction subseries simulation;
  Providing network communication between users and blockchain nodes, that allow any validating user in the said subset to receive any transaction subseries and its dependencies data for transaction subseries simulation;

Executing said special blockchain transaction by one of the users in the said subset, so that every user in the subset authorizes the transaction and it is successfully added to the blockchain database;

Adopting policy to reject attempts of individual execution of transactions in said series after said special blockchain transaction is executed;

Iterating a sequence of transaction subseries and applying the following steps for each subseries:

Receiving transaction and dependencies data for transaction subseries and storing them in said local memory by every validating user in the subset;

Simulating of transaction subseries getting the data from said local memory by every validating user within the subset, calculating combined transaction;

Submitting combined transaction to the database by one of the validating users in the subset;

Authorizing submitted combined transaction by all validating users in the said subset based on the fact that database state change associated with said combined transaction matches database state change that they calculated in a result of own independent transaction subseries simulation on the previous step;

Finalizing submitted combined transaction execution in the database according to normal transaction execution process, resulting in the same database state change as if transaction subseries was executed as normal.

Detailed description of a method of processing for finite transaction series between subset of blockchain database users:

Let's assume that: (a) subset of one or more blockchain database users (U) run a finite series of transactions (T), where they are originators; (b) subset of users (V) within (U) is required to jointly authorize results of transaction series (T); (c) users (V) are capable to run local transaction execution simulation for series (T) on their own nodes for fixed database state, calculating resulting database state change, including ability to determine unique transaction order, if required; (d) any transaction in (T) do not have any constraints/dependencies over database state changes applied after timestamp (TS1), apart from those represented by transactions in series (T); (e) it is ensured via some mechanism that blockchain transactions, which are not in (T) and are executed before timestamp (TS2)>(TS1), do not have any constraints/dependencies over database state changes applied as a result of execution of series (T).

Under these assumptions, instead of normal one by one execution of transactions in series (T) with application of consensus mechanism for each transaction, users can execute them with following method, comprising of four stages, which require consensus mechanism to be applied only two times.

First stage—agreement to use the method: one of the users from (U) originates and executes transaction (T_Start) with (U) as signatories, which defines that users in (U) agreed to apply described method to upcoming series (T) and results are required to be authorized by all users in (V).

Second stage—transaction series caching: each user in (V) receives data of all transactions in (T) and their dependencies and temporarily stores it locally (e.g. fetching transactions from other nodes).

Third stage—local simulation for transaction series: each user in (V) uses fixed database state after timestamp (TS1)+ (F) and before (TS2)−(F), where (F) is a constant representing maximum tolerable difference in blockchain node server time, and run local transaction validation simulation for all transactions in (T) calculating combined database state change. Combined database state change calculated by user (v) in (V) corresponds to a sequence of all state changes considered as approved in a result of simulation for series (T) and is represented as single combined transaction (T_End_v), for which (v) is originator, (V) are signatories, and constraints are added to check that (T_Start) is executed and no other (T_End_*) transaction was processed for (T) in the database already.

Four stage—execution of combined transaction: before (TS2)−(F) one of the users (v) from (V) originates and executes calculated transaction (T_End_v). Each user (v2) in (V) authorizes the transaction (T_End_v), if its state change equals to their own state change calculation for (T_End_v2). In case, if there are discrepancies between (T_End_*) state changes and as consequence transaction (T_End_v) is not authorized, users (U) shall resolve it using specialized process, which is not covered in this method description (e.g. raising alert to system administrators and manual intervention). If (T_End_v) is successfully validated and approved, resulting database state change reflects whole series (T) in the blockchain database with just two transactions being executed within the network—(T_Start) and (T_End_v).

Method can be implemented as software program to be operated in conjunction with blockchain database implementation.

FIG. 13 illustrates application of described method for a hypothetical use case with: (U)=User 1, User 2, User 3, User 4; (V)=User 3, User 4; (T)=Tx1 (signatories—User 1 and User 2), Tx2 (signatory—User 1), Tx3 (signatories—User 2 and User 3), Tx4 (signatory—User 4), Tx5 (signatories—User 3 and User 4), Tx6 (signatory—User 2), Tx7 (signatories—User 2, User 3 and User 4). With normal execution transactions in (T) are executed sequentially resulting in changes of blockchain database states. Novel execution starts with agreement between all users on method application with constants (TS1) and (TS2) using transaction T_Start authorized by all of them. Afterwards, data for transactions in (T) and their dependencies is shared with User 3 and User 4. Having transaction data, User 3 and User 4 use valid database state between (TS1) and (TS2) and run local simulation of (T), which do not require communication with other users or blockchain database nodes. As a result of simulation, they calculate combined transactions (T_End_User3) and (T_End_User4). User 3 executes (T_End_User3) getting authorization for the transaction from User 4, which verifies that associated state change matches the one he calculated for (T_End_User4). Execution of (T_End_User3) happens before (TS2) and leads to database state change reflecting full series of transactions (T). This novel execution process ensures normal blockchain database operations and security guarantees, if assumptions are correct that transactions in (T) do not have dependencies on database state changes happened after (TS1) and no other database transactions depend on results of (T) execution before (TS2)>(TS1).

Description of a method of processing for perpetual transaction series between subset of blockchain database users:

Let's assume that: (a) subset of one or more blockchain database users (U) run a perpetual series (T) of transactions, where they are originators; (b) there is a rule of splitting series (T) into a sequence of finite subseries (T[1]), (T[2]), (T[N]), . . . , where N is an epoch number, so that for each subseries T[n]: (b1) transactions in (T[n]) do not have any constraints/dependencies over database state changes applied after (TS1[n]), apart from those represented by transactions in subseries (T[n]); (b2) it is ensured via some mechanism that blockchain transactions, which are not in (T[n]) and are executed before timestamp (TS2[n])>(TS1[n]), do not have any constraints/dependencies over database state changes applied as a result of execution of subseries (T[n]); (e) (TS2[n])<=(TS1[n+1]), so that transactions in subsequent subseries can have dependencies/constraints on previous subseries; (b3) subset of users (V) within (U) is required to jointly authorize results of every transaction subseries; (b4) users (V) are capable to run local transaction execution simulation for any finite subseries (T[x]) on their own nodes for fixed database state, calculating resulting database state change, including ability to determine unique transaction order, if required.

Under these assumptions, instead of normal one by one execution of transactions in series (T) with application of consensus mechanism for each transaction, users can execute them with following method, comprising of one initialization stage and three iterative stages, which require consensus mechanism to be applied only once for initialization and once for each finite subseries.

Initialization stage—agreement to use the method: one of the users from (U) originates and executes transaction (T_Start) with (U) as signatories, which defines that users in (U) agreed to apply described method to series (T) with certain principle of splitting it into a sequence of finite subseries, which satisfies assumptions, and results of every subseries are required to be authorized by all users in (V).

For each finite series (T[x]) in (T[1]), (T[2]), . . . (T[N]), . . . users (V) run three stages:

First stage—transaction subseries caching: each user in (V) receives data of all transactions in subseries (T[x]) and their dependencies and temporarily stores it locally (e.g. fetching transactions from other nodes).

Second stage—local simulation for transaction subseries: each user in (V) uses fixed database state after timestamp (TS1[x])+(F) and before (TS2[x])−(F), where (F) is a constant representing maximum tolerable difference in blockchain node server time, and run local transaction validation simulation for all transactions in (T[x]) calculating combined database state change. According to assumption (TS2[x−1])<=(TS1[x]), simulation will account dependencies/constraints over database state changes applied as a result of previous subseries (T[x−1]), (T[x−2]), . . . , (T[1]). Combined database state change calculated by user (v) in (V) corresponds to a sequence of all state changes considered as approved in a result of simulation for subseries (T[x]) and is represented as single combined transaction (T[x]_End_v), for which (v) is originator, (V) are signatories, and constraints are added to check that (T_Start) is executed and no other (T[x]_End_*) transaction was processed for (T[x]) in the database already.

Third stage—execution of combined transaction: before (TS2[x])−(F) one of the users (v) from (V) originates and executes calculated transaction (T[x]_End_v). Each user (v2) in (V) authorizes the transaction (T[x]_End_v), if its state change equals to their own state change calculation for (T[x]_End_v2). In case, if there are discrepancies between (T[x]_End_*) state changes and as consequence transaction (T[x]_End_u) is not authorized, users (U) shall resolve it using specialized process, which is not covered in this method description (e.g. raising alert to system administrators and manual intervention). If (T[x]_End_v) is successfully validated and approved, resulting database state change reflects whole subseries (T[x]) in the blockchain database with just one transaction being executed within the network—(T[x]_End_v).

Method can be implemented as software program to be operated in conjunction with blockchain database implementation.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

EXAMPLE

Advertiser signed smart contract with a publisher on ad campaign placement. It is agreed in the contract that Advertiser will pay Publisher for ad impressions, which have independent confirmations from three sources—Demand Side Platform (DSP), Supply Side Platform (SSP) and Content Verification (CV) Platform. It is also agreed that for accountability and security reasons confirmations shall be reported by said platforms to the blockchain database. For every impression Publisher or Advertiser shall be able to run blockchain transaction representing payment for impression, which needs to be approved by both sides if there are confirmations by DSP, SSP and CV Platform. Accordingly, following transactions are expected in the blockchain database: (a) high volume of transactions with ad impression confirmations by DSP; (b) high volume of transactions with ad impression confirmations by SSP; (c) high volume of transactions with ad impression confirmations by CV Platform; (d) high volume of transactions with ad impression payments by Publisher/Advertiser.

Based on the fact, that latency of impression confirmations reporting can be up to 12 hours and 24 hours latency of payments for delivered impressions is acceptable for publisher and advertisers, it was agreed to implement method of processing for perpetual transaction series between subset of blockchain database users to reduce requirements on blockchain database throughput.

Method is implemented using the following parameters: (U)=Advertiser, DSP, SSP, CV Platform, Publisher; (V)=Advertiser, Publisher; (T)=all transactions in the blockchain database related to the said smart contract between Advertiser and Publisher; (F)=1 minute; (T) shall be splitted into a sequence of finite hourly subseries (T[hour_start, hour_end]) based on transaction timestamps; (TS2[hour_start,hour_end])=hour_end+14 hours (12 hours impression confirmation reporting latency plus 2 hours reserved for method simulation/execution stages); (TS1[hour_start,hour_end])=hour_end+12 hours.

Initialization stage—agreement to use the method: advertiser or publisher originates and executes (T_Start) transaction, which is authorized by all parties and defines agreed method for transactions processing and its parameters. After that blockchain database rejects individual transactions in (T).

Advertiser and publisher iterate a sequence of hourly transaction subseries (T[hour_start,hour_end]):

First stage—transaction subseries caching: receive data of ad impression confirmations for the period [hour_start, hour_end] from DSP, SSP and CV Platform and temporarily store it locally.

As DSP, SSP and CV Platform transactions within (T) are not processed in the blockchain database individually, additional security measure is used to ensure their data immutability and integrity: (a) after [hour_end+12 hours+1 minute] DSP runs trusted timestamping blockchain transaction for subset of own transactions in (T[hour_start,hour_end]); (b) after [hour_end+12 hours+1 minute] SSP runs trusted timestamping blockchain transaction for subset of own transactions in (T[hour_start,hour_end]); (c) after [hour_end+12 hours+1 minute] CV Platform runs trusted timestamping blockchain transaction for subset of own transactions in (T[hour_start,hour_end]).

Upon receipt of DSP, SSP and CV Platform transaction data Publisher and Advertiser verify its integrity based on trusted timestamping data.

Second stage—local simulation for transaction subseries: between [hour_end+12 hours+1 minute] and [hour_end+14 hours-1 minute], use current blockchain database state and locally simulate transaction subseries execution, calculating combined transaction, which contains aggregated result on how many impressions in the period [hour_start,hour_end] are confirmed/rejected and amount Advertiser need to pay to Publisher for them.

Third stage—execution of combined transaction: before [hour_end+14 hours-1 minute] Advertiser or Publisher originates calculated combined transaction representing payment for impressions within period [hour_start, hour_end]. Another party authorizes the transaction, if it matches with results independently calculated on the previous stage. In case if there are discrepancies in results between Publisher and Advertiser, they resolve it by raising alert to system administrators and running manual intervention. As a result of successful combined transaction execution Publisher is granted to receive confirmed payment from Advertiser.

As a result of method application only one blockchain transaction is required for clearing of hourly transaction subseries without trusted timestamping, and 4 transaction are required if trusted timestamping is used for DSP, SSP and CV Platform transactions. It dramatically reduces required blockchain transaction throughput compared to originally expected for per impression transaction processing.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or non-transitory computer-readable medium providing computer executable instructions, or program code, for use by or in connection with a computer or any instruction execution system. For the purposes of this description, a non-transitory computer-usable or computer readable medium can be any apparatus that can contain or store the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, RAM, ROM, a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

What is claimed is:

1. A method for operating a distributed computer system, the method comprising:
   aggregating audit log events into timeframe aligned audit data blocks, wherein aggregating audit log events into timeframe aligned audit data blocks comprises:
   at a data processing node device, authenticating an event log reporter device;
   at the data processing node device, receiving an audit event record from the authenticated event log reporter device, wherein the audit event record includes an event timestamp and a payload; and
   at the data processing node device, in response to receiving the audit event record from the authenticated event log reporter device, writing the audit event record into an audit data block of the timeframe aligned audit data blocks, wherein the audit data block of the timeframe aligned audit data blocks includes a set of audit event records within a particular timeframe, and wherein the event timestamp of the audit event record falls within the particular timeframe of the audit data block of the timeframe aligned audit data blocks;
   determining that a current time is greater than an end timestamp of the audit data block of the timeframe aligned audit data blocks plus a finalization time interval, and performing, based on the determination:
   at a data processing node device, storing the audit data block of the timeframe aligned audit blocks at an audit data blocks storage;
   at the data processing node device, generating a cryptographic hash of the audit data block of the timeframe aligned audit data blocks;
   at the data processing node device, generating a digital signature for the audit data block of the timeframe aligned audit data blocks, using a private key of the data processing node device;

at a data processing node device, generating an audit data block registration transaction that corresponds to the audit data block of the timeframe aligned audit data blocks, wherein the audit data block registration transaction includes an identifier of the data processing node device, the particular timeframe of the audit data block of the timeframe aligned audit data blocks, the cryptographic hash of the audit data block of the timeframe aligned audit data blocks, and the digital signature storing the audit data block registration transaction in a blockchain database; and adding a timestamp to the audit data block registration transaction when the audit data block registration transaction is stored to the blockchain database;

and performing an authentication operation on the timeframe aligned data blocks in the blockchain database, wherein performing the authentication operation on the timeframe aligned audit data blocks in the blockchain database comprises:

verifying, by an auditor, data block immutability and timestamp by calculating a second cryptographic hash and looking up the cryptographic hash in the blockchain database;

determining, by the auditor, that the cryptographic hash matches with the calculated second cryptographic hash; and verifying, by the auditor, content of the audit data block, based on the determining.

2. One or more non-transitory computer-readable storage media storing one or more sequences of program instructions which when executed by one or more computing devices, cause the one or more computing devices to perform:

aggregating audit log events into timeframe aligned audit data blocks, wherein aggregating audit log events into timeframe aligned audit data blocks comprises:

at a data processing node device, authenticating an event log reporter device;

at the data processing node device, receiving an audit event record from the authenticated event log reporter device, wherein the audit event record includes an event timestamp and a payload; and at the data processing node device, in response to receiving the audit event record from the authenticated event log reporter device, writing the audit event record into an audit data block of the timeframe aligned audit data blocks, wherein the audit data block of the timeframe aligned audit data blocks includes a set of audit event records within a particular timeframe, and wherein the event timestamp of the audit event record falls within the particular timeframe of the audit data block of the timeframe aligned audit data blocks;

determining that a current time is greater than an end timestamp of the audit data block of the timeframe aligned audit data blocks plus a finalization time interval, and performing, based on the determination:

at a data processing node device, storing the audit data block of the timeframe aligned audit blocks at an audit data blocks storage;

at the data processing node device, generating a cryptographic hash of the audit data block of the timeframe aligned audit data blocks;

at the data processing node device, generating a digital signature for the audit data block of the timeframe aligned audit data blocks, using a private key of the data processing node device;

at a data processing node device, generating an audit data block registration transaction that corresponds to the audit data block of the timeframe aligned audit data blocks, wherein the audit data block registration transaction includes an identifier of the data processing node device, the particular timeframe of the audit data block of the timeframe aligned audit data blocks, the cryptographic hash of the audit data block of the timeframe aligned audit data blocks, and the digital signature storing the audit data block registration transaction in a blockchain database; and adding a timestamp to the audit data block registration transaction when the audit data block registration transaction is stored to the blockchain database;

and performing an authentication operation on the timeframe aligned data blocks in the blockchain database, wherein performing the authentication operation on the timeframe aligned audit data blocks in the blockchain database comprises:

verifying, by an auditor, data block immutability and timestamp by calculating a second cryptographic hash and looking up the cryptographic hash in the blockchain database;

determining, by the auditor, that the cryptographic hash matches with the calculated second cryptographic hash; and verifying, by the auditor, content of the audit data block, based on the determining.

3. A distributed computer system comprising:

one or more processors; and computer readable storage media coupled to the one or more processors storing instructions which, when executed by the one or more processors, causes the one or more processors to perform:

aggregating audit log events into timeframe aligned audit data blocks, wherein aggregating audit log events into timeframe aligned audit data blocks comprises:

at a data processing node device, authenticating an event log reporter device;

at the data processing node device, receiving an audit event record from the authenticated event log reporter device, wherein the audit event record includes an event timestamp and a payload; and at the data processing node device, in response to receiving the audit event record from the authenticated event log reporter device, writing the audit event record into an audit data block of the timeframe aligned audit data blocks, wherein the audit data block of the timeframe aligned audit data blocks includes a set of audit event records within a particular timeframe, and wherein the event timestamp of the audit event record falls within the particular timeframe of the audit data block of the timeframe aligned audit data blocks;

determining that a current time is greater than an end timestamp of the audit data block of the timeframe aligned audit data blocks plus a finalization time interval, and performing, based on the determination:

at a data processing node device, storing the audit data block of the timeframe aligned audit blocks at an audit data blocks storage;

at the data processing node device, generating a cryptographic hash of the audit data block of the timeframe aligned audit data blocks;

at the data processing node device, generating a digital signature for the audit data block of the timeframe aligned audit data blocks, using a private key of the data processing node device;

at a data processing node device, generating an audit data block registration transaction that corresponds to the audit data block of the timeframe aligned audit data blocks, wherein the audit data block registration transaction includes an identifier of the data processing node device, the particular timeframe of the audit data block of the timeframe aligned audit data blocks, the cryptographic hash of the audit data block of the timeframe aligned audit data blocks, and the digital signature storing the audit data block registration transaction in a blockchain database; and adding a timestamp to the audit data block registration transaction when the audit data block registration transaction is stored to the blockchain database; and performing an authentication operation on the timeframe aligned data blocks in the blockchain database, wherein performing the authentication operation on the timeframe aligned audit data blocks in the blockchain database comprises:

verifying, by an auditor, data block immutability and timestamp by calculating a second cryptographic hash and looking up the cryptographic hash in the blockchain database;

determining, by the auditor, that the cryptographic hash matches with the calculated second cryptographic hash; and verifying, by the auditor, content of the audit data block, based on the determining.

4. The method of claim 1, wherein the identifier of the data processing node device comprises an Electronic System Blockchain Address.

5. The one or more non-transitory computer-readable storage media of claim 2, wherein the identifier of the data processing node device comprises an Electronic System Blockchain Address.

6. The distributed computer system of claim 3, wherein the identifier of the data processing node device comprises an Electronic System Blockchain Address.

* * * * *